United States Patent
Hashimoto et al.

(10) Patent No.: US 12,459,194 B2
(45) Date of Patent: Nov. 4, 2025

(54) FREEFORM POLYMER PRECIPITATION (FPP) IN MICROPARTICULATE GELS

(71) Applicant: Singapore University of Technology and Design, Singapore (SG)

(72) Inventors: Michinao Hashimoto, Singapore (SG); Rahul Karyappa, Singapore (SG)

(73) Assignee: Singapore University of Technology and Design, Singapore (SG)

( * ) Notice: Subject to any disclaimer, the term of this patent is extended or adjusted under 35 U.S.C. 154(b) by 87 days.

(21) Appl. No.: 18/256,544

(22) PCT Filed: Dec. 10, 2021

(86) PCT No.: PCT/SG2021/050784
§ 371 (c)(1),
(2) Date: Jun. 8, 2023

(87) PCT Pub. No.: WO2022/124997
PCT Pub. Date: Jun. 16, 2022

(65) Prior Publication Data
US 2024/0092011 A1    Mar. 21, 2024

(30) Foreign Application Priority Data

Dec. 11, 2020    (SG) .......................... 10202012429U

(51) Int. Cl.
*B29C 64/118* (2017.01)
*B29C 64/106* (2017.01)
(Continued)

(52) U.S. Cl.
CPC .......... *B29C 64/106* (2017.08); *C09D 11/033* (2013.01); *C09D 11/10* (2013.01);
(Continued)

(58) Field of Classification Search
CPC ..... B29C 64/106; B29C 64/118; B29C 64/40; B29K 2001/08; B29K 2001/12;
(Continued)

(56) References Cited

U.S. PATENT DOCUMENTS

| 5,121,329 A | 6/1992 | Crump |
| 2020/0047399 A1 | 2/2020 | Guvendiren et al. |
| 2020/0307068 A1 | 10/2020 | Huang et al. |

FOREIGN PATENT DOCUMENTS

CN    109851727 A    6/2019

OTHER PUBLICATIONS

Utela, B.; Storti, D.; Anderson, R.; Ganter, M. "A review of process development steps for new material systems in three dimensional printing (3DP)," J. Manuf. Process. 2008, 10, 96-104.
(Continued)

*Primary Examiner* — Leo B Tentoni

(57) ABSTRACT

Herein disclosed is a method of printing a 3D freeform structure in an embedding medium. The method includes providing an ink composition in a nozzle, wherein the ink composition includes a thermoplastic, a non-thermoplastic, a thermally degradable polymer, and/or a thermosensitive polymer, dissolved in a solvent; dispensing the ink composition through a nozzle into the embedding medium to precipitate a printed structure from the ink composition, wherein the ink composition exits from the nozzle directly in the embedding medium; and maintaining the printed structure in the embedding medium until the immersion precipitation is completed for forming the 3D freeform structure. A system operable to carry out the method is also disclosed. The system includes a syringe coupled to a nozzle.

14 Claims, 28 Drawing Sheets

(51) Int. Cl.

| | |
|---|---|
| B29C 64/40 | (2017.01) |
| B33Y 10/00 | (2015.01) |
| C09D 11/033 | (2014.01) |
| C09D 11/10 | (2014.01) |
| C09D 11/54 | (2014.01) |
| B29K 1/00 | (2006.01) |
| B29K 25/00 | (2006.01) |
| B29K 55/02 | (2006.01) |
| B29K 67/00 | (2006.01) |
| B29K 77/00 | (2006.01) |
| B29K 401/00 | (2006.01) |
| B29K 503/08 | (2006.01) |

(52) U.S. Cl.
CPC .......... *C09D 11/54* (2013.01); *B29K 2001/08* (2013.01); *B29K 2001/12* (2013.01); *B29K 2001/14* (2013.01); *B29K 2023/06* (2013.01); *B29K 2025/06* (2013.01); *B29K 2055/02* (2013.01); *B29K 2067/00* (2013.01); *B29K 2067/046* (2013.01); *B29K 2077/00* (2013.01); *B29K 2401/00* (2013.01); *B29K 2403/00* (2013.01); *B29K 2503/08* (2013.01)

(58) Field of Classification Search
CPC ............ B29K 2001/14; B29K 2023/06; B29K 2025/06; B29K 2055/02; B29K 2067/00; B29K 2067/046; B29K 2077/00; B29K 2401/00; B29K 2403/00; B29K 2503/08; B33Y 10/00; B33Y 70/00
USPC .............. 264/298, 308, 313, 331.13, 331.17, 264/331.19, 331.21
See application file for complete search history.

(56) References Cited

OTHER PUBLICATIONS

Pitts, J. D.; Campagnola, P. J.; Epling, G. A.; Goodman, S. L., "Submicron multiphoton freeform fabrication of proteins and polymers: Studies of reaction efficiencies and applications in sustained release," Macromolecules 2000, 33, 1514-1523.
Guo, S. Z.; Gosselin, F.; Guerin, N.; Lanouette, A. M.; Heuzey, M. C.; Therriault, D., "Solvent-cast three-dimensional printing of multifunctional microsystems," Small 2013, 9, 4118-4122.
Ladd, C.; So, J. H.; Muth, J.; Dickey, M. D., "3D printing of free standing liquid metal microstructures," Adv. Mater. 2013, 25, 5081-5085.
Farahani, R. D.; Chizari, K.; Therriault, D., "Three-dimensional printing of freeform helical microstructures: a review," Nanoscale 2014, 6, 10470-10485.
Goh, W. H.; Hashimoto, M., "Dual sacrificial molding: Fabricating 3D microchannels with overhang and helical features," Micromachines 2018, 9, 523.
Tutum, C. C.; Chockchowwat, S.; Vouga, E.; Miikkulainen, R., "Functional generative design: an evolutionary approach to 3D-printing," GECCO '18: Proceedings of the Genetic and Evolutionary Computation Conference, Kyoto, Japan, Kyoto, Japan, 2018; p. 1379.
Dizon, J. R. C.; Espera, A. H.; Chen, Q. Y.; Advincula, R. C., "Mechanical characterization of 3D-printed polymers," Addit. Manuf. 2018, 20, 44-67.
Yamada, A.; Niikura, F.; Ikuta, K., "A three-dimensional microfabrication system for biodegradable polymers with high resolution and biocompatibility," J. Micromech. Microeng. 2008, 18, 025035.
Guo, S. Z.; Yang, X.; Heuzey, M. C.; Therriault, D., "3D printing of a multifunctional nanocomposite helical liquid sensor," Nanoscale 2015, 7 (15), 6451-6456.
Lanouette, A.; Hill, J.; Demers-Dussault, P.; Laurin, J.; Therriault, D., "3D printing of double Ka band helical micro-antennas," Nanotechnology 2013, 2, 416-419.
Lebel, L. L.; Aissa, B.; El Khakani, M. A.; Therriault, D., "Ultraviolet-assisted direct-write fabrication of carbon nanotube/polymer nanocomposite microcoils," Adv. Mater. 2010, 22, 592-596.
Farahani, R. D.; Lebel, L. L.; Therriault, D., "Processing parameters investigation for the fabrication of self-supported and freeform polymeric microstructures using ultraviolet-assisted three-dimensional printing," J. Micromech. Microeng. 2014, 24, 1-12.
Guo, S. Z.; Heuzey, M. C.; Therriault, D., "Properties of polylactide inks for solvent-cast printing of three-dimensional freeform microstructures," Langmuir 2014, 30 (4), 1142-1150.
Pattinson, S. W.; Hart, A. J., "Additive Manufacturing of Cellulosic Materials with Robust Mechanics and Antimicrobial Functionality," Adv. Mater. Technol. 2017, 2 (4), 1600084.
Zhang, F.; Ma, Y.; Liao, J.; Breedveld, V.; Lively, R. P., "Solution-Based 3D Printing of Polymers of Intrinsic Microporosity," Macromol. Rapid Commun. 2018, 39, 1800274.
Muth, J. T.; Vogt, D. M.; Truby, R. L.; Mengüç, Y.; Kolesky, D. B.; Wood, R. J.; Lewis, J. A., "Embedded 3D printing of strain sensors within highly stretchable elastomers," Adv. Mater. 2014, 26, 6307-6312.
Bhattacharjee, T.; Zehnder, S. M.; Rowe, K. G.; Jain, S.; Nixon, R. M.; Sawyer, W. G.; Angelini, T. E., "Writing in the granular gel medium," Science Advances 2015, 1, e1500655.
Hinton, T. J.; Hudson, A.; Pusch, K.; Lee, A.; Feinberg, A. W., "3D Printing PDMS Elastomer in a Hydrophilic Support Bath via Freeform Reversible Embedding," ACS Biomater. Sci. Eng. 2016, 2 (10), 1781-1786.
Hajash, K.; Sparrman, B.; Guberan, C.; Laucks, J.; Tibbits, S., "Large-Scale Rapid Liquid Printing," 3D Print. Addit. Manuf. 2017, 4 (3), 123-131.
Leblanc, K. J.; Niemi, S. R.; Bennett, A. I.; Harris, K. L.; Schulze, K. D.; Sawyer, W. G.; Taylor, C.; Angelini, T. E., "Stability of High Speed 3D Printing in Liquid-Like Solids," ACS Biomater. Sci. Eng. 2016, 2, 1796-1799.
O'Bryan, C. S.; Bhattacharjee, T.; Hart, S.; Kabb, C. P.; Schulze, K. D.; Chilakala, I.; Sumerlin, B. S.; Sawyer, W. G.; Angelini, T. E., "Self-assembled micro-organogels for 3D printing silicone structures," Science Advances 2017, 3, e1602800.
Jin, Y.; Chai, W.; Huang, Y., "Printability study of hydrogel solution extrusion in nanoclay yield-stress bath during printing-then-gelation biofabrication," Mater. Sci. Eng. 2017, C80, 313-325.
Ding, H.; Chang, R. C., "Printability study of bioprinted tubular structures using liquid hydrogel precursors in a support bath," Appl. Sci. 2018, 8, 403.
Karyappa, R.; Ohno, A.; Hashimoto, M., "Immersion Precipitation 3D Printing (ip3DP)," Mater. Horiz. 2019, 6, 1834-1844.
Bruneaux, J.; Therriault, D.; Heuzey, M.-C., "Micro-extrusion of organic inks for direct-write assembly," J. Micromech. Microeng. 2008, 18, 115020.
Hinton, T. J.; Jallerat, Q.; Palchesko, R. N.; Park, J. H.; Grodzicki, M. S.; Shue, H.-J.; Ramadan, M. H.; Hudson, A. R.; Feinberg, A. W., "Three-dimensional printing of complex biological structures by freeform reversible embedding of suspended hydrogels," Science Advances 2015, 1, e1500758.
Lee, A.; Hudson, A. R.; Shiwarski, D. J.; Tashman, J. W.; Hinton, T. J.; Yerneni, S.; Bliley, J. M.; Campbell, P. G.; Feinberg, A. W., "3D bioprinting of collagen to rebuild components of the human heart," Science 2019, 365, 482-487.
O'Bryan, C. S.; Bhattacharjee, T.; Niemi, S. R.; Balachandar, S.; Baldwin, N.; Ellison, S. T.; Taylor, C. R.; Sawyer, W. G.; Angelini, T. E., "Three-dimensional printing with sacrificial materials for soft matter manufacturing," MRS Bull. 2017, 42, 571-577.
Highley, C. B.; Rodell, C. B.; Burdick, J. A., "Direct 3D Printing of Shear-Thinning Hydrogels into Self-Healing Hydrogels," Adv. Mater. 2015, 27, 5075-5079.
Lubrizol technical data sheet No. 243. https://www.lubrizol.com/-/media/Lubrizol/Health/TDS/TDS243OptimizingPerformanceCarbopolETD2020Ultrez10PartialNeutralizationPolymerDispersions.pdf.

(56) References Cited

OTHER PUBLICATIONS

Curran, S. J.; Hayes, R. E.; Afacan, A.; Williams, M. C.; Tanguy, P. A., "Properties of Carbopol solutions as models for yield-stress fluids," J. Food Sci. 2002, 67, 176-180.

Roberts, G. P.; Barnes, H. A., "New measurements of the flow-curves for Carbopol dispersions without slip artefacts," Rheol. Acta 2001, 40, 499-503.

Kim, J.-Y.; Song, J.-Y.; Lee, E.-J.; Park, S.-K., "Rheological properties and microstructures of Carbopol gel network system," Colloid Polym. Sci. 2003, 281, 614-623.

Bhattacharjee, T.; Kabb, C. P.; O'Bryan, C. S.; Urueña, J. M.; Sumerlin, B. S.; Sawyer, W. G.; Angelini, T. E., "Polyelectrolyte scaling laws for microgel yielding near jamming," Soft Matter 2018, 14, 1559-1570.

Di Giuseppe, E.; Corbi, F.; Funiciello, F.; A.Massmeyer; Santimano, T. N.; Rosenau, M.; Davaille, A., "Characterization of Carbopol® hydrogel rheology for experimental tectonics and geodynamics," Tectonophysics 2015, 642, 29-45.

Okay, O.; Sariisik, S. B., "Swelling behavior of poly(acrylamide-co-sodium acrylate) hydrogels in aqueous salt solutions: theory versus experiments," Euro. Polym. J. 2000, 36, 393-399.

Hooper, H. H.; Baker, J. P.; Blanch, H. W.; Prausnitz, J. M., "Swelling equilibria for positively ionized polyacrylamide hydrogels," Macromolecules 1990, 23, 1096-1104.

Berry, S. M.; Harfenist, S. A.; Cohn, R. W.; Keynton, R. S., "Characterization of micromanipulator-controlled dry spinning of micro- and sub-microscale polymer fibers," J. Micromech. Microeng. 2006, 16, 1825-1832.

Beris, A. N.; Tsamopoulos, J. A.; Armstrong, R. C.; Brown, R. A., "Creeping motion of a sphere through a Bingham plastic," J. Fluid Mech. 1985, 158, 219-244.

Putz, A. M. V.; Burghelea, T. I.; Frigaard, I. A.; Martinez, D. M., "Settling of an isolated spherical particle in a yield stress shear thinning fluid," Phys. Fluids 2008, 20, 033102.

Derksen, P. J. J., "Direct simulations of spherical particle motion in Bingham liquids," Comput. Chem. Eng. 2011, 35, 1200-1214.

Yuk, H.; Zhao, X., "A new 3D printing strategy by harnessing deformation, instability, and fracture of viscoelastic inks," Advanced Materials 2018, 30, 1704028.

Nelson, A. Z.; Kundukad, B.; Wong, W. K.; Khan, S. A.; Doyle, P. S., "Embedded droplet printing in yield-stress fluids," Proc. Natl. Acad. Sci. U. S. A. 2020, 117, 5671-5679.

Grosskopf et al., "Viscoplastic Matrix Materials for Embedded 3D Printing," ACS Appl. Mater. Interfaces 2018, 10, 27, 23353-23361 https://doi.org/10.1021/acsami.7b19818.

Zhao et al., "A mini-review of embedded 3D printing: supporting media and strategies," J. Mater. Chem. B, 2020, 8, 10474-10486 https://doi.org/10.1039/D0TB01819H.

Secor et al., "Tailoring the Porosity and Microstructure of Printed Graphene Electrodes via Polymer Phase Inversion," J. Phys. Chem. C 2018, 122, 25, 13745-13750.

Chen et al., "Mechanically Robust, Ultraelastic Hierarchical Foam with Tunable Properties via 3D Printing," Adv. Funct. Mater. 2018, 28, 1800631. https://doi.org/10.1002/adfm.201800631.

Tu et al., "Precipitation printing towards diverse materials, mechanical tailoring and functional devices," Additive Manufacturing, vol. 35, 2020, 101358, https://doi.org/10.1016/j.addma.2020.101358.

Zhang et al., "A guide to solution-based additive manufacturing of polymeric structures: Ink design, porosity manipulation, and printing strategy," J Adv Manuf Process. 2019; e10026. https://doi.org/10.1002/amp2.10026.

FIG. 1A

| Sr. No. | Name | Abbreviation | Form |
| --- | --- | --- | --- |
| 1 | High impact polystyrene | HIPS | Filament |
| 2 | Polystyrene | PS | Food container |
| 3 | Acrylonitrile Butadiene Styrene | ABS | Filament |
| 4 | Acrylonitrile Styrene Acrylate | ASA | Filament |
| 5 | Polyethylene | PE | Petri dish |
| 6 | Polylactic Acid | PLA | Filament |
| 7 | Polycaprolactone | PCL | Pellet |
| 8 | Cellulose Acetate | CA | Powder |
| 9 | Cellulose Acetate Propionate | CAP | Powder |
| 10 | Cellulose Acetate Butyrate | CAB | Powder |

FIG. 1B

| Sr. No. | Name | Abbreviation in the main text | Abbreviation in the figures | Form |
|---|---|---|---|---|
| 1 | Acetone | | A | Liquid |
| 2 | Chloroform | | Ch | Liquid |
| 3 | Dichloromethane | DCM | Dc | Liquid |
| 4 | Dimethyl Formamide | DMF | Dm | Liquid |
| 5 | Dimethyl Sulfoxide | DMSO | Ds | Liquid |
| 6 | Hand Sanitiser | EG | EG | Liquid |
| 7 | Carbopol ETD 2020 NF | CG | CG | Powder |
| 8 | Polyethylene Glycol (Mol. Wt. 300) | PEG | PEG | Liquid |
| 9 | Starch | Starch | Starch | Powder |
| 10 | Laponite Clay EP Grade | LP | LP | Powder |
| 11 | α-Cellulose | αC | αC | Powder |

| Sr. No. | Polymer | Conc. (w/w%) | Solvent | Embedding media |
|---|---|---|---|---|
| 1 | HIPS | 20-30 | Acetone | CG, EG |
| 2 | PS | 25-30 | Acetone, DMF | CG, EG |
| 3 | ABS | 20-60 | Acetone, DMF, DCM | CG, EG |
| 4 | ASA | 30-50 | Acetone | CG, EG |
| 5 | PE | 20-30 | Acetone, DCM | CG, EG |
| 6 | PLA | 15-30 | DCM, Chloroform | EG |
| 7 | PCL | 40-60 | DCM, Chloroform | EG |
| 8 | CA | 20-30 | Acetone, DMSO | CG, EG |
| 9 | CAP | 20-30 | Acetone | CG, EG |
| 10 | CAB | 20-30 | Acetone | CG, EG |

ABS60/A/CG0.2

ABS45/A/CG0.6

PCL40+αC/
Dm/EG

ABS45+LP20/
A/CG0.2

ABS45/A/CG0.2

ABS45+PEG40/
A/CG0.2

ABS60/A/CG0.6

ABS60+PEG20/
A/CG0.6

FREEFORM POLYMER PRECIPITATION (FPP) IN MICROPARTICULATE GELS

CROSS-REFERENCE TO RELATED APPLICATION

This application is a national stage of PCT/SG2021/050784, filed 10 Dec. 2021, which claims the benefit of priority to Singapore patent application Ser. No. 10/202,012429U, filed 11 Dec. 2020, and which applications are hereby incorporated by reference in their entireties for all purposes. To the extent appropriate a claim of priority is made to each of the above disclosed applications.

TECHNICAL FIELD

The present disclosure relates to a method of printing a three-dimensional (3D) freeform structure in an embedding medium. The present disclosure also relates to a system operable to carry out the method.

BACKGROUND

Recent advances in three-dimensional (3D) printing have enabled fabricating 3D structures consisting of polymers, ceramics, and metals using computer-aided design (CAD) models. Extrusion-based 3D printing demonstrated the fabrication of complex 3D structures, but the fabrication of 3D freeform structures involving overhang (non-anchored) structures remains cumbersome or challenging without support materials.

For example, fused deposition modeling (FDM) 3D printing requires removable support materials to fabricate freeform structures. FDM offers advantages in simplicity, cost, and accessibility, but there tends to be drawbacks inherent to its printing mechanism, such as (1) printed materials need to be in a filament or pellet form to be compatible with heat extrusion, (2) heat-sensitive materials (such as cellulose esters) are incompatible, (3) freeform fabrication tends to be limited by conditions of printing (very slow speed of printing).

As another example, light-assisted extrusion-printing and direct ink writing (DIW) may be deemed alternative methods, which are based on liquid precursors and photopolymerization. However, both methods may be limited in terms of the materials' applicability and printing conditions. For example, low-viscosity inks may not be applicable due to immediate sagging, the inks must be photocurable to retain the shape after extrusion. Solvent-cast 3D printing (SC3DP) may be an example of DIW 3D printing to create 3D models of thermoplastics at the room temperature. In SC3DP, the evaporation of the solvent triggers the solidification of the printed ink. Such printing mechanism has the following characteristics: (1) the rate of fabrication tends to be limited by the rate of solvent evaporation, (2) printable polymers tends to be limited to those that can be dissolved in solvents with high vapor pressures (such as dichloromethane), and (3) fabrication of freeform structures tends to be limited to low speed printing and small build volume.

There is thus a need to provide for a solution that addresses one or more of the limitations mentioned above. The solution should at least provide for freeform printing of polymers, including thermoplastics.

SUMMARY

The present disclosure provides an advantageous approach to 3D-print thermoplastics in embedding medium based on in situ immersion precipitation of polymer inks printed in microparticulate gels.

In a first aspect, there is provided for a method of printing a 3D freeform structure in an embedding medium, the method includes:
  providing an ink composition in a nozzle, wherein the ink composition includes a thermoplastic, a non-thermoplastic, a thermally degradable polymer, and/or a thermosensitive polymer, dissolved in a solvent;
  dispensing the ink composition through a nozzle into the embedding medium to precipitate a printed structure from the ink composition, wherein the ink composition exits from the nozzle directly in the embedding medium; and
  maintaining the printed structure in the embedding medium until the immersion precipitation is completed for forming the 3D freeform structure. In various embodiments, forming the 3D freeform structure may include obtaining the solidified 3D freeform structure by removing the surrounding media.

In another aspect, there is provided for a system operable to carry out the method as described in various embodiments of the first aspect, the system includes:
  a syringe coupled to a nozzle, wherein the syringe is operable to dispense an ink composition including a thermoplastic, a non-thermoplastic, a thermally degradable polymer, and/or a thermosensitive polymer, dissolved in a solvent;
  a motion control module which controls vertical and horizontal positioning of the syringe; and
  a support bath configured to house the embedding medium.

BRIEF DESCRIPTION OF THE DRAWINGS

The drawings are not necessarily to scale, emphasis instead generally being placed upon illustrating the principles of the present disclosure. In the following description, various embodiments of the present disclosure are described with reference to the following drawings, in which:

FIG. 1A is a table listing 3D printed polymers demonstrated in examples herein.

FIG. 1B Solvents and additives used in examples herein.

DETAILED DESCRIPTION

Figures 1C, 1D:
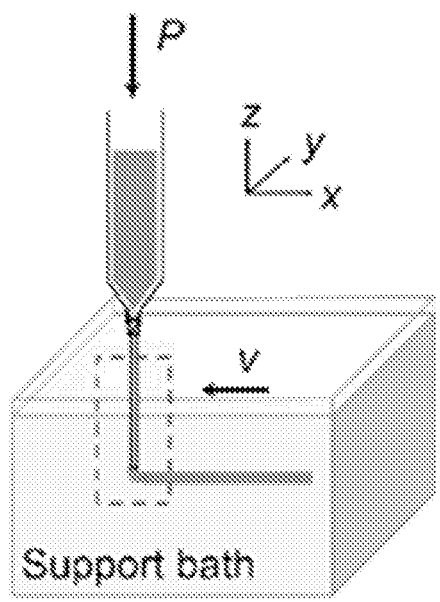
FIG. 1C is a table listing formulations of inks (in w/w %) and corresponding embedding media used in examples herein.
FIG. 1D is a schematic illustration of freeform polymer precipitation (FPP) in an embedding medium.

The following detailed description refers to the accompanying drawings that show, by way of illustration, specific details and embodiments in which the present disclosure may be practised.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The present disclosure relates to a method and system which address the difficulty of freeform fabrication via extrusion-based printing. The present disclosure may include the use of microparticulate gels as embedding medium. Methods that use embedding medium may be traditionally termed embedded 3D printing (e3DP), for example, 3D printing of thermally cured and UV-cured resins in hydrogels. In such reports, the gels behaved as Bingham plastics with a low modulus and low yield stress during the printing of low-viscosity resins. The motion of the tip of the printing nozzle yields the surrounding medium, and the rapid recovery of the yielded medium traps the printed ink. 3D printing in yield-stress baths may have been demonstrated for low-viscosity hydrogel precursor solutions. The hydrogel precursors were solidified under appropriate conditions (photochemically or thermally). e3DP enabled the freeform fabrication of different materials such as silicones, hydrogels, casting alloys, colloids, and hydrogels containing living cells. Despite all the reported examples, e3DP is disadvantageous for freeform fabrication of thermoplastics. This is because the molten thermoplastics and the nozzles may have to reach more than 100° C. to be printable, and tend to be incompatible with the reported support medium consisting of microparticulate hydrogels. Because of this limitation, freeform fabrication of thermoplastics cannot be performed from the nozzle end combined with reported hydrogels medium. Besides, fabrication of freeform structures with e3DP requires nozzles with long capillary lengths (tend to be >4 cm), which is not suitable for FDM printing, as the temperature control over the full length of the capillary becomes difficult for maintaining the molten state of the thermoplastics. Existing applicability of e3DP has been limited to fabricating mechanically strong components in freeform manners. However, the present method and system address or circumvent the limitations of e3DP. Although the present method involves embedded medium, the present method differs from reported examples of embedded 3D printing. In the present method and system, the embedding medium offers physical supports to the printed structures and provide chemical environments for solidification of the printed ink. More importantly, the present method is advantageous for printing ink compositions that include thermoplastics.

Details of various embodiments of the present method and system, and advantages associated with the various embodiments are now described below. Where advantages have been described in the examples further hereinbelow, they shall not be reiterated for brevity.

In the present disclosure, there is provided a method of printing a 3D freeform structure in an embedding medium. The method may include providing an ink composition in a nozzle, wherein the ink composition includes a thermoplastic, a non-thermoplastic, a thermally degradable polymer, and/or a thermosensitive polymer, dissolved in a solvent, dispensing the ink composition through a nozzle into the embedding medium to precipitate a printed structure from the ink composition (i.e. having the ink composition solidify in the embedding medium to form the printed structure), wherein the ink composition exits from the nozzle directly in the embedding medium, and maintaining the printed structure in the embedding medium until the immersion precipitation (until precipitation of the printed structure from the ink composition) is completed (e.g. for at least 30 mins, at least 40 mins, at least 50 mins, at least an hour, etc.) for forming the 3D freeform structure.

The term "freeform structure" herein means that the printed structure is absent of additional or external elements to support the printed freeform structure. For example, a freeform structure printed via the present method and system may have an overhanging portion (i.e. printed together). The overhanging portion is able to remain attached to the freeform structure without the need to separately print another supporting element to maintain such an attachment or to prop up the overhanging portion without collapsing.

The term "thermoplastic" herein refer to any plastic material that becomes molten when heated, solid when cooled, and can be re-melted or molded after cooling. This process is reversible without compromising the material's physical integrity. In other words, a thermoplastic is a polymer which may be influenced to flow upon heating above its melting temperature. After cooling, the polymer becomes solidified. These polymers can provide strength and rigidity to the fabricated parts. Examples of thermoplastic herein may include, but not limited to, polylactic acid (PLA), acrylonitrile butadiene styrene (ABS), polyamide (PA) or nylon, high impact polystyrene (HIPS) and thermoplastic elastomer (TPE). 3D structures fabricated using thermoplastics and their composites exhibited a wide range of applications—sensors, microvascular networks and tissue engineering.

In various embodiments, the thermoplastic may include, without being limited to, acrylonitrile butadiene styrene, acrylonitrile styrene acrylate, high impact polystyrene, polystyrene, polyamide, polycaprolactone, polyethylene, or polylactic acid. In various embodiments, the non-thermoplastic may include, without being limited to, cellulose acetate, cellulose acetate butyrate, cellulose acetate propionate, cellulose ester, or a derivative thereof.

In various embodiments, providing the ink composition may include dissolving the thermoplastic in the solvent to form the ink composition having the thermoplastic present at a concentration of 20 to 60 w/w %, 30 to 60 w/w %, 40 to 60 w/w %, 50 to 60 w/w %, etc.

In various embodiments, the solvent may include acetone, dimethyl formamide, dichloromethane, chloroform, or dimethyl sulfoxide.

In various embodiments, the ink composition may have a vapor pressure of 0.04 to 60 kPa, 0.04 to 20 kPa, 20 to 40 kPa, 40 to 60 kPa, etc., and/or a viscosity of 0.1 to 1000 Pa·s, 1 to 1000 Pa·s, 10 to 1000 Pa·s, 100 to 1000 Pa·s, etc. In various non-limiting instances, the ink composition may have a vapor pressure and/or viscosity that falls within one of these described ranges.

In various embodiments, dispensing the ink composition may include applying a pressure of 10 to 600 kPa, 100 to 600 kPa, 200 to 600 kPa, 300 to 600 kPa, 400 to 600 kPa, 500 to 600 kPa, etc., and/or dispensing the ink composition at a temperature of 20 to 30° C., 20 to 25° C., 25 to 30° C., etc. Advantageously, the present method is able to print 3D freeform structures without heating the thermoplastic in the ink composition to its melting point.

The present method involves an embedding medium. The embedding medium used herein may be a microparticulate gel. The term "embedding medium" herein is interchangeably used with "embedded medium", "microparticulate embedding medium", or simply "microparticulate medium". Microparticulate gels are a form of hydrogels consisting hydrogels of micron-sized particulates. In microparticulate gels, translation of printing nozzles does not destroy the structure of the gel by allowing to zip and unzip the tool path of the nozzle. In various embodiments, the embedding medium may have a yield stress of 17 Pa to 130 kPa, 50 Pa to 130 kPa, 100 Pa to 130 kPa, etc., and a shear modulus of 85 to 259 Pa, 100 to 259 Pa, 150 to 259 Pa, 200 to 259 Pa, etc. The yield stress of the embedding medium allows to maintain the 3D structure of the printed polymer ink in situ. In various embodiments, the embedding medium may include or may be a water-based gel or an ethanol-based gel. The water-based gel may include or may be a carbopol gel. The carbopol gel may be present at a concentration of 0.2 to 1.2 w/w %, 0.6 to 1.2 w/w %, 1 to 1.2 w/w %, etc. The ethanol-based gel may include or may be ethanol. Other embedding media which helps the ink composition printed therein to precipitate (i.e. solidify) into a printed structure may be used.

In various embodiments, dispensing the ink composition through the nozzle may include moving the nozzle horizontally in the embedded medium at a speed of 12 mm/s or less, 1 to 12 mm/s, 5 to 12 mm/s, 10 to 12 mm/s, etc. In various instances, the nozzle speed operated may fall within one of these described ranges.

In certain non-limiting embodiments, dispensing the ink composition through the nozzle may include operating a syringe, which is coupled to the nozzle, to have the nozzle positioned at a first height in the embedded medium to form a first layer of the printed structure, and operating the syringe to have the nozzle positioned at a second height in the embedded medium to form a second layer of the printed structure attached to the first layer of the printed structure. The first height and the second height may have a difference which renders the nozzle to migrate along and urge against the first layer without getting stuck in the first layer. The term "urge" herein describes that the nozzle pushes against the first layer, which has already precipitated in a solid structure, as the nozzle moves along the first layer while depositing the next layer of ink composition.

In certain non-limiting embodiments, dispensing the ink composition through the nozzle may include operating a syringe, which is coupled to the nozzle, to have the nozzle positioned at a first height in the embedded medium to form a first layer of the printed structure, and operating the syringe to have the nozzle positioned at a second height in the embedded medium to form a second layer of the printed structure spaced apart (i.e. not in contact with) from the first layer of the printed structure. The first height and the second height may have a difference which renders the nozzle to maintain a gap from the first layer.

In certain non-limiting embodiments, dispensing the ink composition through the nozzle may include operating the syringe, which is coupled to the nozzle, to have the nozzle positioned in the embedded medium to form a first layer of the printed structure, and operating the syringe to have the nozzle positioned in the embedded medium at a lateral distance from the first layer of the printed structure to form a second layer of the printed structure laterally attached to the first layer of the printed structure, wherein the first layer of the printed structure may have a width which is longer than the lateral distance. The term "lateral distance" herein refers to distance measured from the side. For example, the lateral distance from the first layer refers to a distance measured from the side of the first layer. The "lateral distance" may be a horizontal distance (e.g. measured at the same height from the side of the first layer) or measured from the side but not at the same height.

In certain non-limiting embodiments, dispensing the ink composition through the nozzle may include operating the syringe, which is coupled to the nozzle, to have the nozzle positioned in the embedded medium to form a first layer of the printed structure, and operating the syringe to have the nozzle positioned in the embedded medium at a lateral distance from the first layer of the printed structure to form a second layer of the printed structure spaced laterally apart from the first layer of the printed structure, wherein the first layer of the printed structure has a width which is shorter than the lateral distance.

In various embodiments, the ink composition may further include an additive. The additive may include starch, α-cellulose, or laponite clay.

In various embodiments, the method may further include removing the solvent from the printed structure after removing the printed structure from the embedded medium to form the 3D freeform structure. For example, heating or sonication may be carried out on the printed structure after removing from the embedded medium.

The present disclosure also provides a system operable to carry out the method described in various embodiments of the first aspect. Embodiments and advantages described for the method of the first aspect can be analogously valid for the present system subsequently described herein, and vice versa. As the various embodiments and advantages have already been described above and in the examples demonstrated further hereinbelow, they shall not be iterated for brevity.

The system may include a syringe coupled to a nozzle, wherein the syringe is operable to dispense an ink composition comprising a thermoplastic, a non-thermoplastic, a thermally degradable polymer, and/or a thermosensitive polymer, dissolved in a solvent, a motion control module which controls vertical and horizontal positioning of the syringe, and a support bath configured to house the embedding medium.

In various embodiments, the syringe is operable to supply a pressure of 10 to 600 kPa, 100 to 600 kPa, 200 to 600 kPa, 300 to 600 kPa, 400 to 600 kPa, 500 to 600 kPa, etc., and/or at a temperature of 20 to 30° C., 20 to 25° C., 25 to 30° C., etc., to dispense the ink composition from the nozzle.

In various embodiments, the nozzle may have a diameter of 60 to 850 μm, 100 to 850 μm, 200 to 850 μm, 300 to 850 μm, 400 to 850 μm, 500 to 850 μm, 600 to 850 μm, 700 to 850 μm, 800 to 850 μm, etc., and/or a length of 2 to 4 cm, 3 to 4 cm, etc. In various non-limiting instances, the nozzle may have a diameter and/or length that falls within one of these described ranges.

In various embodiments, the motion control module is operable to move the nozzle horizontally in the embedded medium at a speed of 12 mm/s or less, 1 to 12 mm/s, 5 to 12 mm/s, 10 to 12 mm/s, etc. In various instances, the nozzle speed operated may fall within one of these described ranges.

In certain non-limiting embodiments, the syringe is operable to have the nozzle positioned at a first height in the embedded medium to form a first layer of the printed structure, and the syringe is operable to have the nozzle positioned at a second height in the embedded medium to form a second layer of the printed structure attached to the first layer of the printed structure. The first height and the second height may have a difference which renders the nozzle to migrate along and urge against the first layer without getting stuck in the first layer.

In certain non-limiting embodiments, the syringe is operable to have the nozzle positioned at a first height in the embedded medium to form a first layer of the printed structure, and the syringe is operable to have the nozzle positioned at a second height in the embedded medium to form a second layer of the printed structure spaced apart from the first layer of the printed structure. The first height and the second height may have a difference which renders the nozzle to maintain a gap from the first layer.

In certain non-limiting embodiments, the syringe is operable to have the nozzle positioned in the embedded medium to form a first layer of the printed structure, and the syringe is operable to have the nozzle positioned in the embedded medium at a lateral distance from the first layer of the printed structure to form a second layer of the printed structure laterally attached to the first layer of the printed structure, wherein the first layer of the printed structure may have a width which is longer than the lateral distance.

In certain non-limiting embodiments, the syringe is operable to have the nozzle positioned in the embedded medium to form a first layer of the printed structure, and the syringe is operable to have the nozzle positioned in the embedded medium at a lateral distance from the first layer of the printed structure to form a second layer of the printed structure spaced laterally apart from the first layer of the printed structure, wherein the first layer of the printed structure may have a width which is shorter than the lateral distance.

In summary, traditional embedded 3D printing (e3DP) has demonstrated fabricating freeform structures of curable polymer resins in microparticulate hydrogels. This traditional method is, however, not compatible with thermoplastics as such methods tend to require extrusion at high temperature. Conversely, the present disclosure presents an advantageous approach to 3D print thermoplastics in an embedding medium, wherein the present method may be termed herein "freeform polymer precipitation (FPP)". FPP can be based on spatially controlled immersion precipitation of polymer inks patterned in microparticulate gels for various thermoplastics with additives. The embedding medium offers the dual advantages of: being a Bingham plastic to maintain printed structures, and being a nonsolvent for in situ precipitation of polymer ink composition (i.e. polymer inks). For the present method, advantageously, the polymer inks can be printable with the present method and system even while having a wide range of vapor pressure (0.04-60 kPa) and viscosity (0.1-1000 Pa·s), which are demonstrated in the examples section hereinbelow. As a non-limiting example, using acrylonitrile butadiene styrene (ABS) dissolved in acetone (20-60 w/w %) as one example of the various inks demonstrated, the printing conditions to ensure vertical and lateral attachments of printed inks were identified. The fabricated 3D objects can be porous due to rapid phase separation induced by nonsolvent, which may be controlled by the concentration of the polymer and the porogens in the inks. FPP offers an advantageous route to fabricate 3D freeform structures of thermoplastics with controlled internal porosity and serves as a useful toolkit to 3D print multi-functional materials such as polymer nanocomposites.

The word "substantially" does not exclude "completely" e.g. a composition which is "substantially free" from Y may be completely free from Y. Where necessary, the word "substantially" may be omitted from the definition of the present disclosure.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Unless specified otherwise, the terms "comprising" and "comprise", and grammatical variants thereof, are intended to represent "open" or "inclusive" language such that they include recited elements but also permit inclusion of additional, unrecited elements.

Examples

The present disclosure relates to a method to 3D print thermoplastics using embedded medium in freeform manners, termed "freeform polymer precipitation (FPP)". In the present FPP, microparticulate gels are used as surrounding medium that simultaneously offer two functions. The microparticulate gels provide structural support to the printed ink and cause the phase change of the printed ink via immersion precipitation. A reported method, referred to as immersion precipitation 3D printing (ip3DP), demonstrated that embedding Newtonian fluids enabled rapid and continuous solidification of the polymer inks for layer-by-layer fabrication. The surrounding Newtonian fluids served as a nonsolvent to the extruded polymer inks. The polymer-solvent-nonsolvent (P-S-NS) ternary system permitted the rapid solidification of the polymer inks prepared with low vapor pressure, such as N-methyl-2-pyrrolidone (NMP), dimethylformamide (DMF), and dimethyl sulfoxide (DMSO). In the current work, 3D printing based on immersion precipitation was verified possible with surrounding microparticulate gels, which unlocked the capability of freeform fabrication of thermoplastics. Examples of the present method illustrate both water-based and ethanol-based microparticulate gels can be used as surrounding gels, allowing greater flexibility and quantity of the solvents and polymers to be used for printing. The present examples demonstrated the fabrication for 14 polymers dissolved in six solvents to highlight the versatility of FPP. This capability is in contrast to SC3DP that works only with high-viscosity polymer inks prepared in high vapor-pressure solvents such as dichloromethane (DCM). It is herein demonstrated the vertical and lateral attachment of the printed filaments in FPP are possible. Further, it is verified that inks with low polymer concentrations (with low viscosity) and inks with pore-inducing agents that confer internal porosity to the printed structures can be used. Overall, FPP allowed freeform fabrication of thermoplastics with controlled porosity, which was previously not possible in e3DP.

The present ink composition and method are described in further details, by way of non-limiting examples, as set forth below.

Example 1A: Experimental—Preparation of Printing Inks

The suppliers of the thermoplastics, solvents, and other chemicals used in this work are summarized (FIGS. 1A and 1B). The thermoplastics were dissolved in suitable solvents to prepare polymer inks with different concentrations. The compositions of these formulated inks are summarized (FIG. 1C). The thermoplastics were placed in the solvents and stirred continuously to obtain homogeneous polymer solutions. The formulated inks were then stored in sealed bottles until used for printing. The inks were directly placed into the dispensing syringes immediately before printing.

Example 1B: Experimental—Characterization of Printing Inks

The apparent viscosity of the polymer inks was determined using capillary flow analysis. Polymer solutions were extruded through nozzles with a straight needle (Ningbo VMATIC Liquid Control Industry Co. Ltd., China) and 90°-bent needle (McMaster-Carr, USA) with the inner diameters of 260 µm (25 Gauge) to 810 µm (19 Gauge) with the capillary length of 2.5 cm and 4 cm, respectively. The dispensing pressure was set to 100-600 kPa. Once the extrusion became steady, the ink was deposited on a petri dish for 10-60 s under the set pressures. The deposited inks were dried for 24 hrs at room temperature (e.g. 24 to 28° C.) and then weighed on a high precision weighing balance to determine the mass flow rates. The respective mass flow rates, calculated by weighing the dried filaments using a high precision balance, were converted to volumetric flow rates. This data was used to calculate apparent viscosities for the applied pressures.

Example 1C: Experimental—Preparation of Embedding Medium

The Carbopol gel (CG) was prepared as embedding medium by following the manufacturer's guidelines on Carbopol ETD 2020 NF (Lubrizol, USA). The desired concentration of Carbopol powder was added into 100 mL of deionized (DI) water (Thermo Fisher Scientific, USA). The dispersion was then mixed in a planetary centrifugal Thinky mixer (THINKY, USA) for about 5 mins at 2000 rpm (revolutions per min) for complete wetting of the Carbopol particles. A neutralizer was added to the dispersion in order to achieve high viscosity or thickening. 0.04 g, 0.1 g and 0.4 g of sodium hydroxide (NaOH) pellets were added as a neutralizer for the 0.2%, 0.6% and 1.0% (w/v) of Carbopol, respectively. The dispersion was then mixed and degassed in a planetary centrifugal Thinky mixer for 20 min at 2000 rpm to get a clear gel. Ethanol-based gel (EG), a hand sanitizer (Lifebuoy, Hindustan Unilever Ltd., India), was used as an embedding medium as purchased.

Example 1D: Experimental—Characterization of Embedding Medium

The steady-state shear viscosity of the gels was characterized using a rheometer (Discovery HR-2, TA Instruments, USA) with a 40-mm parallel plate. The shear rate was ramped stepwise from $0.001\ s^{-1}$ to $2000\ s^{-1}$. Storage and loss moduli were determined from stress-controlled oscillatory measurements performed at 1 Hz. The gap between the plate and the stationary flatbed was 1000 □m in all the rheological experiments. All rheology experiments were performed at room temperature and under atmospheric pressure.

Example 1E: Experimental—FPP (Instrument and Software)

MuCAD V software (Musashi Engineering Inc., Japan) was used to generate the design and printed using liquid dispensers (SHOTmini 200 Sx and IMAGE MASTER 350 PC Smart, Musashi Engineering Inc., Japan). For the designs of CAD, STL data was generated using a commercial CAD program and sliced using Slic3r software into 200-1000 m thick layers to generate the G-code instructions. The G-Code was then converted to the format readable by MuCAD V using a house-made Python script.

Example 1F: Experimental—FPP (Printing)

Before each printing, the nozzle was attached to a cylindrical syringe and placed into its respective position in the liquid dispenser. For every nozzle attached, calibrations in the horizontal (x and y) and the vertical (z) direction (distance between the nozzle tip and the substrate) were performed. The pressure required for the extrusion and nozzle speed in the horizontal (x and y) direction were calibrated according to the printing pattern and the viscosity of the ink. The glass beaker was filled with the embedding medium, and the printing was performed. After completing the printing, the printed structure was kept in the embedding medium for 30-60 mins to ensure complete extraction of solvent from the polymer ink into the surrounding embedding medium. All experiments were performed at room temperature.

Example 1G: Experimental—Thermogravimetric Analysis (TGA)

Pyrolysis tests were performed in a differential thermogravimetric analyzer (Q50, TA Instruments, USA) with a precision of temperature measurement of ±0.1° C. and weight measurement of ±0.01%. The sample weight loss and the rate of weight loss were recorded continuously as a function of time and temperature from 30° C. to 1000° C. The experiments were performed at atmospheric pressure, under nitrogen atmosphere, with a flow rate of 30 mL/min at various linear heating rates of 5, 10, 20 and 30° C./min.

Example 1H: Experimental—Imaging

Photographs were taken using a Nikon D5600 camera (Nikon, Japan) under white-light illumination. Micrographs were taken using a Hirox digital microscope KH-8700 (Hirox Co Ltd., Japan). All image processing was done using ImageJ (National Institute of Health, USA). The microscopic morphologies of the 3D printed objects were observed using a field emission scanning electron microscope (JSM-7600F, JEOL, Japan) at 5-10 kV. The membranous structures were sampled in liquid nitrogen and then sputtered with gold for 30-60 s at 20 mA using an auto fine coater (JFC-1600, JEOL, Japan) before imaging.

Example 2: Results and Discussion—Research

The present examples aimed to demonstrate a straightforward method to fabricate freeform structures of thermoplastics using embedding medium. Freeform fabrication of silicones, hydrogels, casting alloys, colloids, and living cells has been demonstrated by e3DP, but not with thermoplastics. Freeform fabrication of thermoplastics by extrusion-based printing remains challenging and only viable for highly viscous inks consisting of high-vapor-pressure (or rapidly evaporating) solvents via DIW 3D printing. The examples aimed to overcome this constraint. The examples herein studied the printability of polymer inks containing thermoplastics with the viscosity of 0.1-1000 Pa·s. Two types of embedding media were tested for this study (e.g. water-based Carbopol gels and ethanol-based gel). These embedding media were selected for the purpose of demonstration and not intended to be limiting to these two embedding media.

Firstly, the printing outcome depends on the viscoelastic properties of the surrounding medium, which can be readily tuned by the variation of the concentration of Carbopol. Secondly, the surrounding chemical environment (e.g. water and/or ethanol) should permit different polymer inks to solidify via immersion precipitation. With a sufficient understanding of the system and materials, we applied the concept to demonstrate the freeform fabrication of 3D models for 14 different polymers to demonstrate the versatility of the method. Finally, the examples studied the spontaneous formation of micro-to-nanoporous structures due to immersion precipitation within the printed 3D models.

Example 3: Results and Discussion—Polymer Precipitation

Figure 1E:
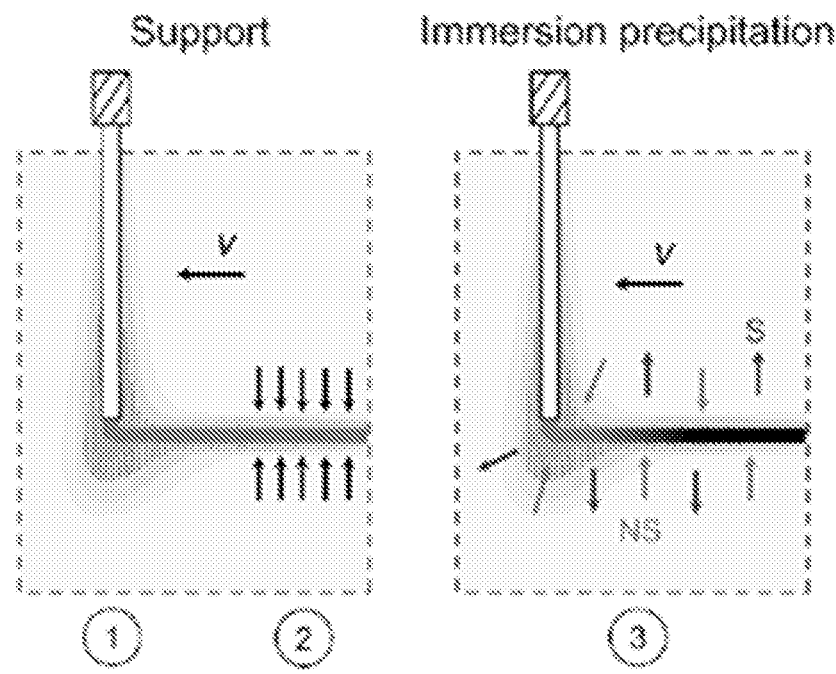
FIG. 1E shows shear-thinning of an embedding medium occurred locally as the nozzle moved (Region 1). The embedding medium exhibited elastic recovery to hold the printed structure (Region 2). The printed object was solidified in situ via immersion precipitation (Region 3).

FIG. 1D provides an overview of FPP. In the present method, polymers are dissolved in solvents to create printing inks and printed the polymer inks from a DIW 3D printer directly in an embedding medium. The embedding medium provided physical support for the printed structures and acted as a nonsolvent for the immersion precipitation simultaneously (FIG. 1E). Similarly to ip3DP, the printed ink rapidly solidified via phase separation by immersion precipitation to form solid structures at the ambient condition (25° C. and 1 atm). The rapid mass transfer of the solvent into the nonsolvent (and vice versa) caused the printed polymer ink to solidify in situ. The solvent diffused into the nonsolvent in the embedding bath while the nonsolvent diffused into the polymer ink. This work demonstrates use of microparticulate gels as embedding medium offering structural support and the nonsolvent-induced precipitation to fabricate freeform structures of thermoplastics.

Example 4: Results and Discussion—Printable Inks for FPP

Figure 1F:
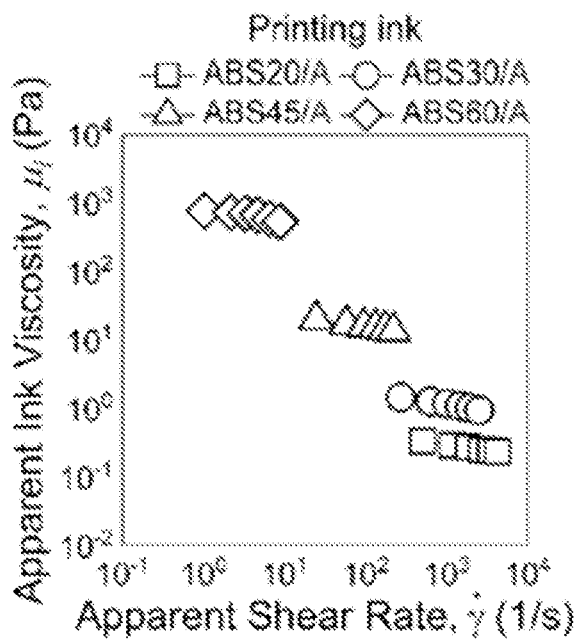
FIG. 1F is a plot of process-related apparent viscosity of polymer ink ($\mu_i$) as a function of process-related shear rate ($\dot{\gamma}$).
Figure 1G:
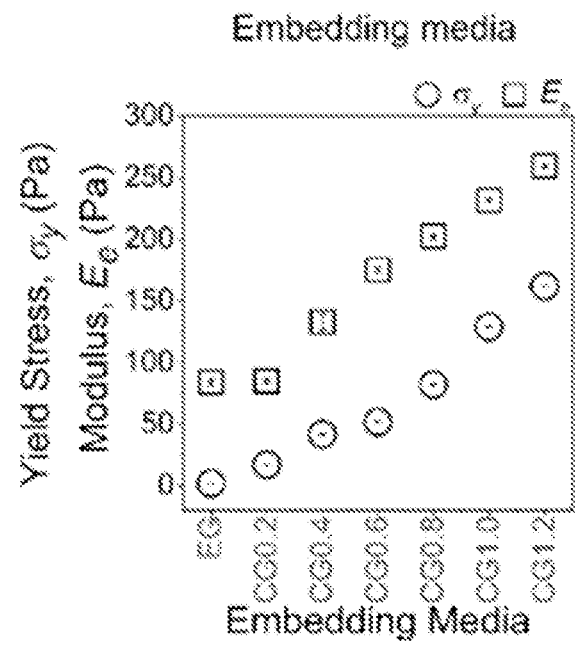
FIG. 1G is a plot of yield stress ($\sigma_y$) and shear modulus ($E_e$) for the studied embedding medium, determined from the stress-strain measurements.
Figure 1H:
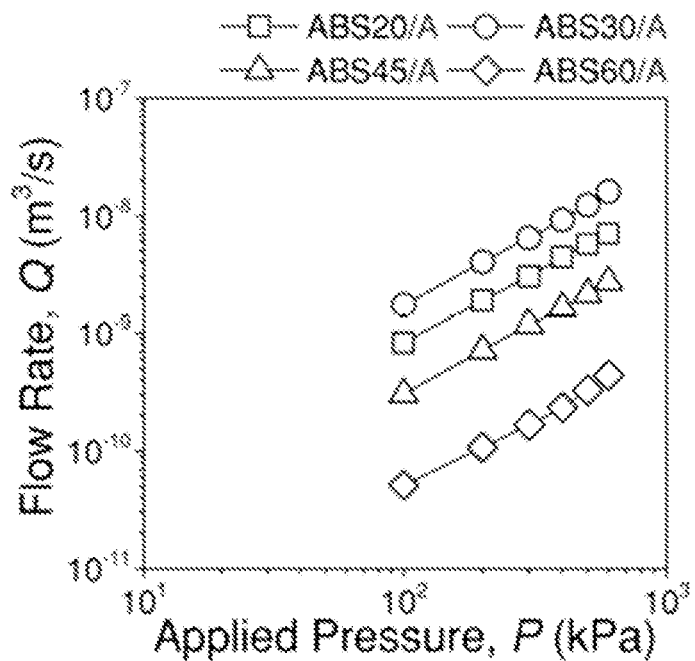
FIG. 1H is a plot showing the volumetric flow rate (Q) as a function of the applied pressure (P) for varying concentrations of ABS dissolved in acetone (20-60 w/w %).
Figure 1I:
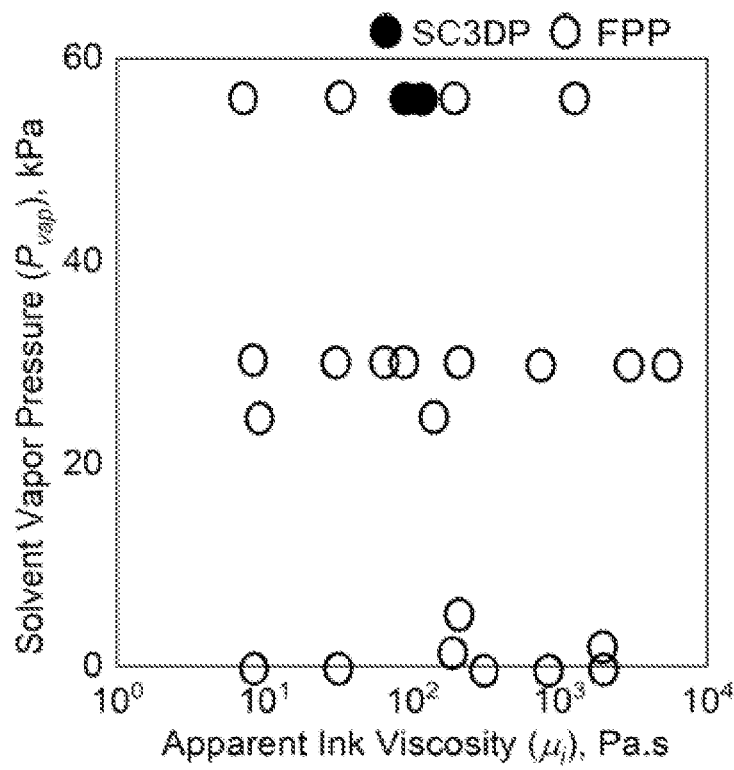
FIG. 1I is a scattered plot showing the solvent vapor pressure ($P_{vap}$) and the apparent ink viscosity (i) used for FPP. The parameters for the published SC3DP are included to highlight the ranges of $\mu_i$ and $P_{vap}$ applicable in FPP.

Initially, investigation on the flow of the polymer inks through a fixed nozzle without a motion-controlled robot was carried out. The polymer inks were extruded through nozzles of different internal diameters ($d_i$=60-810 μm) with varying applied pressure (P=10-600 kPa). The process-related viscosity of the printing inks with P=100-600 kPa using capillary flow analysis was studied. The calculated apparent process-related viscosities ($\mu_i$) as a function of apparent process-related shear rates ($\gamma$) are summarized for four concentrations of ABS dissolved in acetone (FIG. 1F). Throughout the present disclosure, the solution of 20 w/w % of ABS is denoted as ABS20; the same nomenclature was used for ABS and other polymers with varying concentrations. The shear rates were calculated from the capillary flow analysis (measured at different P) obtained from the nominal values of the diameters of the nozzle. Over the investigated ranges of the shear rates, the polymer inks displayed shear-thinning behaviors, characterized by the decreasing viscosity over the increasing shear rate. The apparent viscosities of the polymer inks ($\mu_i$) tested in this example were calculated to be 0.1-1000 Pa·s. The applied pressure (P) positively correlated with the flow rate of the shear-thinning inks through the nozzles (Q) (FIG. 1H). Compared to other printing parameters in a DIW printer, P was the easiest variable to adjust Q. The 2D plot highlights the versatility of FPP (FIG. 1I); the plot indicates the physical parameters of inks (vapor pressure, $P_{vap}$, and $\mu_i$) successfully printed for the fabrication of 3D freeform helical structures in SC3DP and FPP. SC3DP was demonstrated only for the solvents with high values of $P_{vap}$, and $\mu_i$ (plotted with filled circles). In contrast, FPP was demonstrated with the wider ranges of $P_{vap}$, and $\mu_i$ than SC3DP, highlighting the applicability of various polymers and solvents (plotted with open circles).

Example 5: Results and Discussion—Embedding Medium for FPP

Figure 2A:
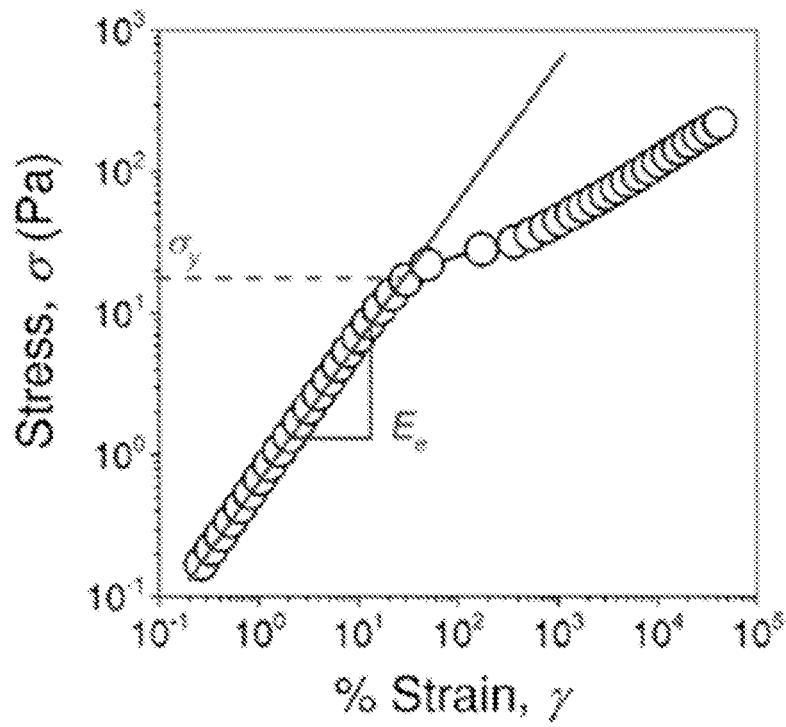
FIG. 2A is a plot showing determination of shear modulus ($E_e$) and yield stress ($\sigma_y$) of embedding medium from the stress-strain measurements.
Figure 2B:
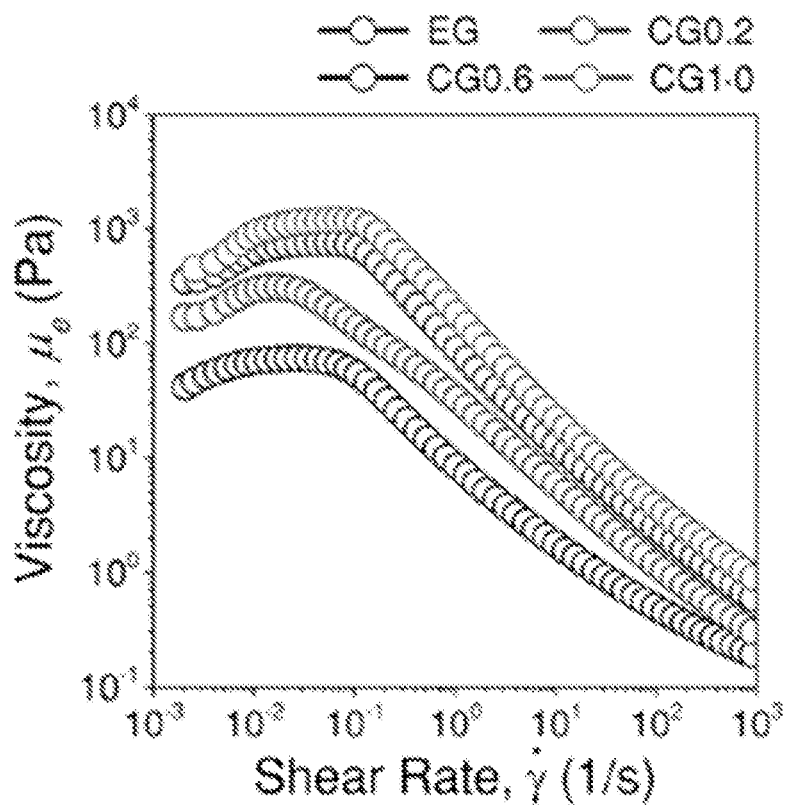
FIG. 2B is a plot showing the viscosity ($\mu_e$) as a function of the applied shear rate ($\dot{\gamma}$) of the embedding medium.

The use of microparticulate gels offered practical solutions to stabilize the printed soft materials during their liquid-to-solid transition in 3D printing. The microparticulate gels have finite yield stress at a long time-scale; they behave as elastic solids at rest, and they are often shear-thinning once yielded by applying sufficient stress. In the present example, aqueous Carbopol gels (CG) and a commercial ethanol-based gel (EG) were each used as microparticulate embedding medium. Carbopol is a water-soluble polymer based on the crosslinked polyacrylic acid. The bulk rheological properties of the aqueous Carbopol solutions depend on its concentrations and the pH. Carbopol dispersions in water are acidic and show near-Newtonian rheological behavior at low concentrations. The addition of neutralizing agents such as sodium hydroxide (NaOH) leads to swelling of the polymer, forming high-viscosity viscoelastic, optically transparent gel due to elongation of polymer chains under the influence of electrostatic repulsion forces. The gel of Carbopol (or other ionic polymers) in water can be converted to a liquid by adding salts such as sodium chloride (NaCl), which is a convenient way to isolate the 3D printed objects. To formulate the embedding gel, we dispersed Carbopol into deionized water with varying concentrations (0.2-1.2 w/w %). The values of yield stress ($\sigma_y$) and the shear modulus ($E_e$) of the gels were plotted as a function of the concentration of Carbopol (FIGS. 1G and 2A). As the concentration of Carbopol increased from CG0.2 to CG1.2 (CG0.2 denoted 0.2 w/w % of Carbopol, and the same nomenclature was used for other concentrations of Carbopol), both $\sigma_y$ and $E_e$ linearly increased from 17 Pa to 162 Pa and from 85 Pa to 259 Pa, respectively. The values of $\sigma_y$ and $E_e$ of EG were 2 Pa and 84 Pa, respectively. In the present example, CG0.2, CG0.6 and CG1.0 are selected as embedding media with varying yield stress properties ($\sigma_y$, $E_e$). The selected embedding media exhibited strong shear-thinning behaviors under the applied shear rate (FIG. 2B). EG was selected as another embedding medium offering the characteristics of an organic nonsolvent. For example, the ink consisting of dichloromethane (DCM) did not solidify in the water-based gel (CG). The same ink is readily solidified in the ethanol-based gel (EG) because of the high miscibility between DCM and ethanol.

Example 6: Results and Discussion—Printing Polymer Inks in Microparticulate Gels The presence of the surrounding medium influences the printability of the polymer inks. The interfacial energy (between the ink and the surrounding medium) has been considered. For example, extrusion of viscous inks of ABS (such as ABS30 and ABS60) did not form continuous filaments but formed droplets due to the capillary effect in the air. In contrast, the same inks formed a continuous filament in ethanol. Ethanol is a Newtonian liquid, which did not affect the dispensing of the ink or the attachment of the printed filaments. In this example, the surrounding medium was microparticulate non-Newtonian gels. How the embedding medium affected the printing of the inks in terms of (1) dispensing, (2) dimension, and (3) attachment, were looked into.

Figure 3A:
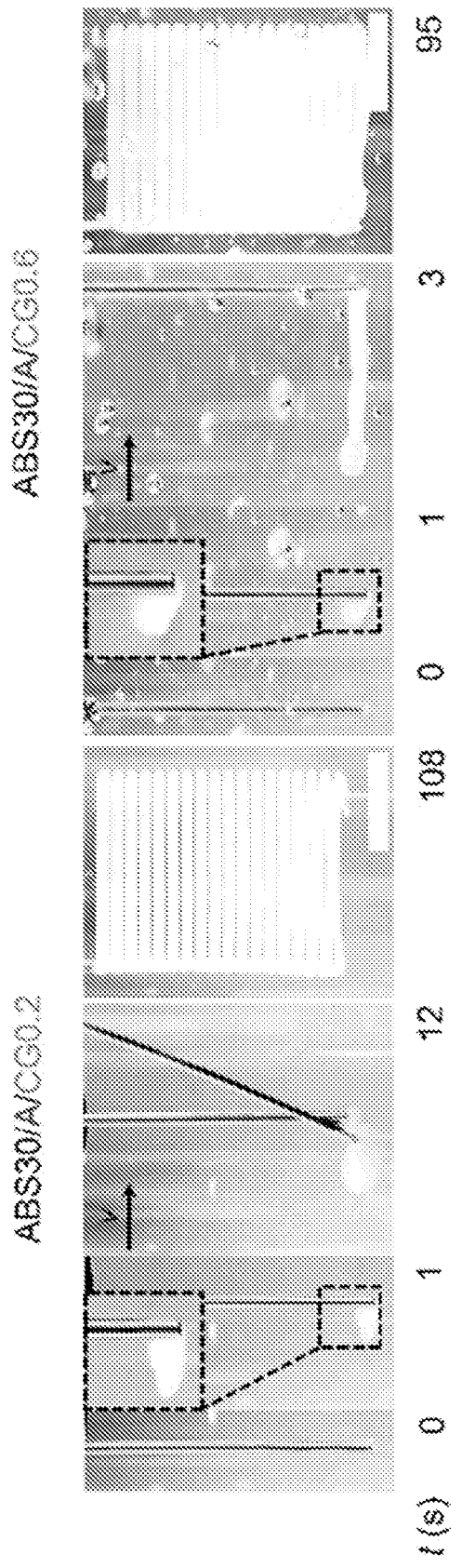
FIG. 3A shows snapshots (left image) of FPP of ABS30 in CG0.2. The ink adhered at the tip of the nozzle at the beginning of the printing. The adhered ink was removed manually. The ink was then continuously dispensed in the embedding medium, and a helical spiral was fabricated. Snapshots (right image) of FPP of ABS30 in CG0.6. The ink adhered at the tip of the nozzle at the beginning of the printing. The adhered ink was held by the yield stress of CG0.6. A helical spiral was fabricated continuously. Scale bars denote 5 mm. The abbreviation "ABS30" denotes for the polymer and its weight concentration (in this instance the polymer is ABS and its weight concentration is 30%). Similar abbreviations are used to describe the polymer solution and embedding media using the chemical names defined in FIG. 1A and FIG. 1B.
Figure 3B:
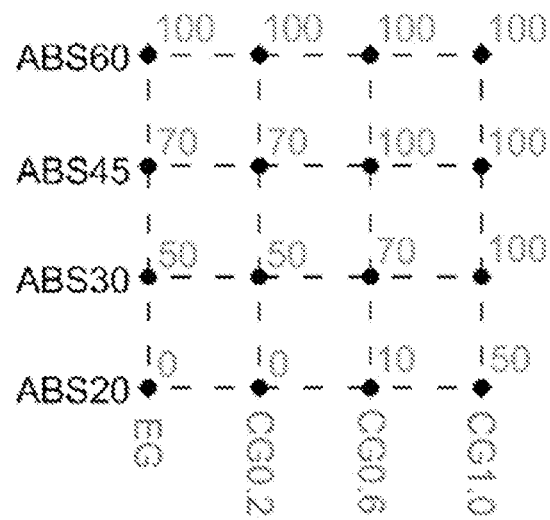
FIG. 3B shows success rate (%) of printing. The success rate of printing was the number of cases that the ink was printed without adherence to the nozzle divided by the number of trials of printing (multiplied by 100 for percentage). Each ink was printed ten times in an embedding medium to identify the success rate.

For the low-viscosity inks (e.g. ABS30) dispensed in the low yield stress medium (e.g. CG0.2), the dispensed ink immediately adhered to the tip of the nozzle. The yield stress characteristics ($\sigma_y$, $E_e$) of CG0.2 were not sufficiently high to trap the adhered ink, and the ink did not detach from the nozzle. In such cases, the accumulated ink was removed manually to continue the printing (FIG. 3A—left image). The success rate of printing was defined as the number of cases that the ink was printed without adherence to the nozzle divided by the number of trials of printing (×100 for percentage). The success rate increased in two ways: (1) increasing ($\sigma_y$, $E_e$) of the embedding medium (FIG. 3A right image and FIG. 3B), and (2) increasing $\mu_i$ of the ink (FIG. 3B). It is noted that these conditions were applicable for the inks prepared with ABS in acetone and printed through a nozzle of stainless steel. Adhesion of the polymer inks to the nozzle, in principle, depends on the material that forms the nozzle tips (e.g. stainless steel, polypropylene, glass). It is also noted that the use of low-viscosity ink was still feasible after manual removal of the adhered ink from the nozzle. The adhesion of the ink took place only at the beginning of printing; after the removal of the accumulated ink, the ink was continuously dispensed from the nozzle in motion.

Figure 4:
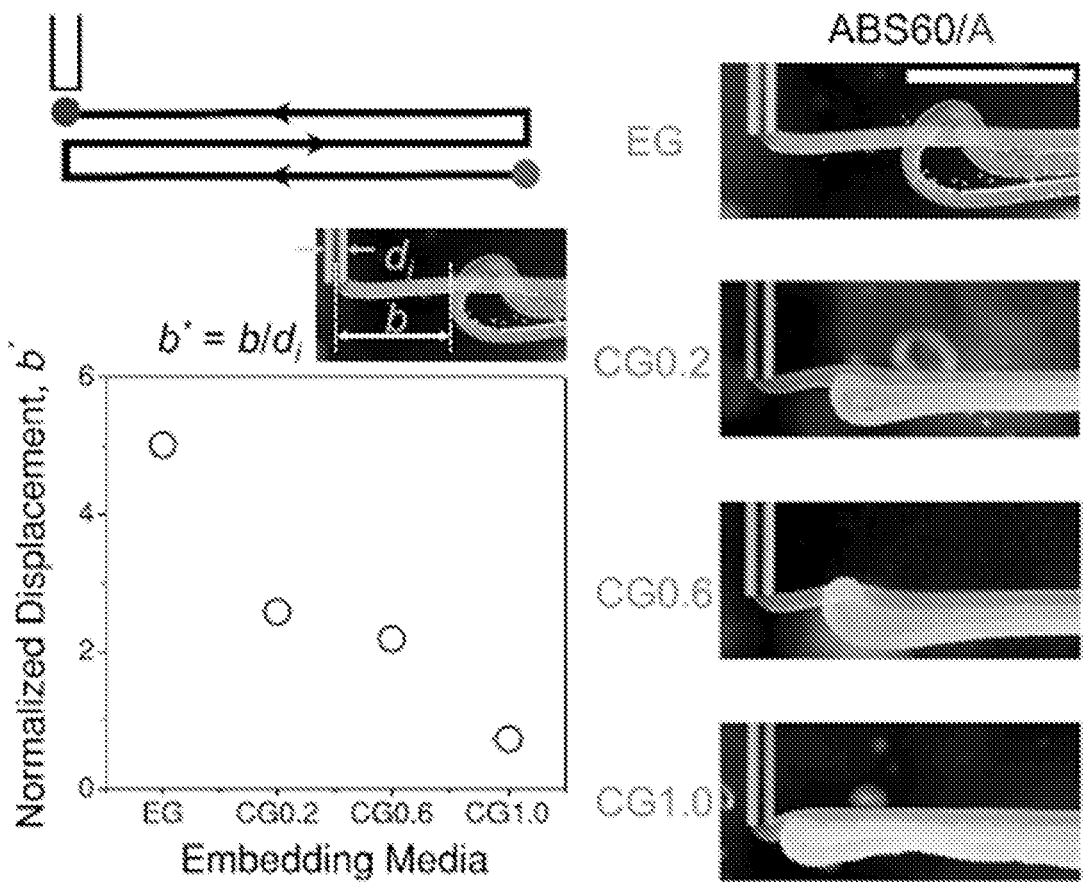
FIG. 4 illustrates for printing of the high-viscosity ink (ABS60) in the four embedding media with varying yield stresses. The top left image is a schematic illustration of the path of the moving nozzle to print three layers. The extrusion started at the position indicated by the blue circle (at lower end of image) and ended at the position indicated by the red circle (proximal to where the nozzle is shown—at higher end of image). The right image shows optical images showing dragging of the printed layers of ABS60 by the moving nozzle within the embedding medium (showing the region indicated by the red circle). The bottom left plot shows normalized lateral displacement of the printed filaments from the nozzle (b*) in the four embedding media. Note that (b*=b/$d_i$), where b is the vertical distance of the displacement of the filament, and $d_i$ is the inner diameter of the nozzle. Scale bar denotes 5 mm.

The success rate of printing of ABS60 was 100% in all the embedding medium tested. The use of the embedding medium with low yield stress properties, however, resulted in dragging and dislocation of the printed inks by the moving nozzle (FIG. 4). This observation suggested that EG and CG0.2 are less suitable embedding media for ABS60. The dragging of the printed inks was not apparent for the embedded media with the high yield stress properties (FIG. 4). Overall, the present example suggested that the rheological properties of both the ink ($\mu_i$) and the embedded medium ($\sigma_y$, $E_e$) were important to ensure the continuous extrusion of the ink from the nozzle in motion.

The above demonstrated dispensing of polymer inks in microparticulate gels. The above also demonstrated that the success rate of dispensing of ABS60 in EG was 100% (FIG. 3B). Although the dispensed ABS60 did not adhere at the tip of the nozzle, the moving nozzle dragged the printed filament within EG. The low values of ($\sigma_y$, $E_e$) of EG were not able to trap the printed filament in EG. The dragging of the printed filament displaced it from the printed position. To understand the effect of embedding medium on the displacement of the printed layers of ABS60, three layers (each layer measuring 6 cm in length) were printed with the printing parameters of (P, v, $d_t$, D)=(600 kPa, 1 mm/s, 810 µm, 0.1 mm) (FIG. 4). After printing the first layer of ABS60 in EG, the nozzle moved upward to print the second layer. Once the nozzle started printing the second layer, the dragging and curling of the previously printed layer were observed (FIG. 4). Similar dragging and curling were observed while printing the third layer. The displacement (b*=b/$d_t$) of the previously printed layers from the nozzle (when it was stationary) (FIG. 4 bottom left plot). The maximum and minimum values of b* were observed for ABS60 printed in EG and CG1.0, respectively (FIG. 4—bottom left plot). The high yield-stress properties of CG1.0 enabled trapping of the printed layers of ABS60 without dragging.

Example 7: Results and Discussion—Effect of Embedding Medium on the Dimensions of the Filament (w, h)

Figure 5:
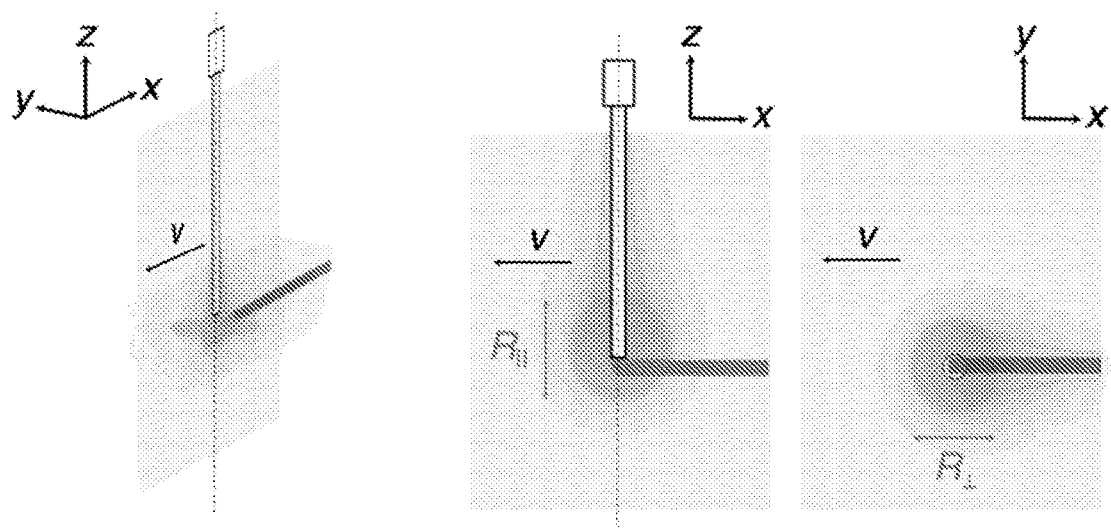
FIG. 5 shows yielding of the embedding medium by the moving nozzle. The left image shows yielding of the embedding medium in the directions parallel and perpendicular to the nozzle. The centre image shows yielded region in the parallel direction at the nozzle tip ($R_\parallel$). The right image shows yielded region in the perpendicular direction at the nozzle tip ($R_\perp$).

The presence of the embedding medium affected the dimensions of the filaments in both horizontal and vertical directions (w, h). A nozzle moving through an embedding medium exerts shear stress onto the medium. The medium turn into fluid and flow around the nozzle. A nozzle moving through an embedding medium is analogous to a solid sphere falling through a stationary container filled with a yield stress liquid. It was demonstrated that the ratio of yielded-to-unyielded regions depended on the yield stress characteristics of the embedding medium. The ratio of the yielded-to-unyielded region decreased as $\sigma_y$ of the embedding medium increased, which influenced the dimensions of the printed filament. It was considered that the yielded region of the embedding medium around the tip of the moving nozzle occurred in two planes, parallel ($R_\parallel$) and perpendicular ($R_\perp$) to the nozzle (FIG. 5). Although the direct measurement of $R_\parallel$ and $R_\parallel$ was not practical, $R_\parallel$ and $R_\perp$ were the function of the yield stress of the surrounding medium and the motion of the nozzle. $R_\parallel$ and $R_\perp$ then influenced the width (w) and the height (h) of the printed filaments, respectively.

Figure 6A:
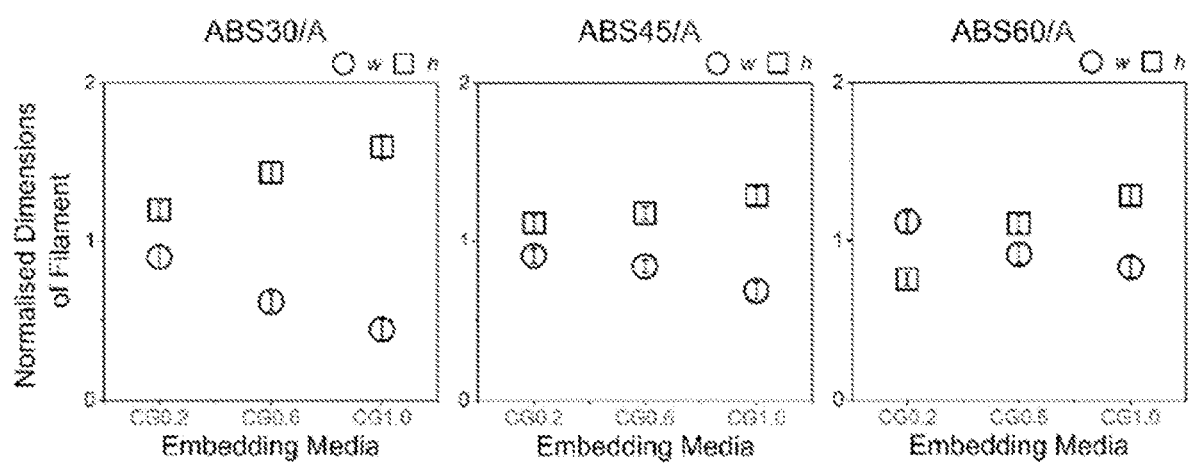
FIG. 6A shows effect of polymer concentration and embedding medium on the dimensions of the filament (w, h) normalized with the inner diameter of the nozzle ($d_i$). The left plot (w, h) for ABS30 in CG, printed with (P, v, $d_i$)=(40 kPa, 6 mm/s, 410 μm). The centre plot (w, h) for ABS45 in CG, printed with (P, v, $d_i$)=(300 kPa, 6 mm/s, 510 μm). The right plot (w, h) for ABS60 in CG, printed with (P, v, $d_i$)=(600 kPa, 1 mm/s, 810 μm).
Figure 7:
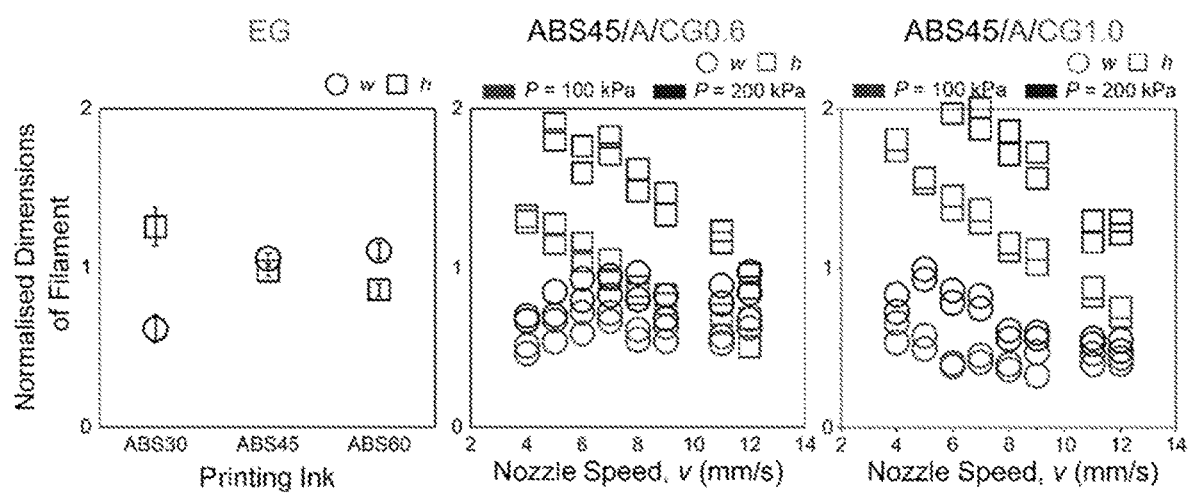
FIG. 7 left plot shows effect of ABS concentration in the ink on the normalized dimensions of the filament (w, h) printed in EG. The printing parameters were (P, v, $d_i$)=(40 kPa, 6 mm/s, 410 μm), (300 kPa, 6 mm/s, 510 μm) and (600 kPa, 1 mm/s, 810 μm) for ABS30, ABS45 and ABS60, respectively. Variations of (w, h) of ABS45 as a function of v using CG0.6 (centre plot) and CG1.0 (right plot). w and h were normalized with $d_i$=600 μm. The inks were printed with P=100 kPa and 200 kPa. For each v, the minimum and maximum values of w and h were plotted.

To investigate the dependence of (w, h) on the yield stress properties of the embedding medium, three ABS inks with different viscosities ($\mu_i$=1-1000 Pa·s) were printed. The embedding media were EG, CG0.2, CG0.6, and CG1.0 (with $\sigma_y$=2 kPa, 17 kPa, 52 kPa, and 129 kPa, respectively). The printing parameters were (P, v, $d_t$)=(40 kPa, 6 mm/s, 410 µm) for ABS30, (P, v, $d_t$) (300 kPa, 6 mm/s, 510 µm) for ABS45, and (P, v, $d_t$)=(600 kPa, 1 mm/s, 810 µm) for ABS60. The plots of normalized dimensions of the filament (values of w and h normalized with $d_t$) for each embedding medium are presented (FIG. 6A, FIG. 7—left plot). These experiments suggested two trends. Firstly, for all three inks, the increase in $\sigma_y$ of the surrounding medium resulted in an increase in h and the decrease in w. In medium with high yield stress (CG1.0), the cross-sectional shape of the printed filaments was an ellipse (with w lower than h) (FIG. 6A). Secondly, the more viscous ink (higher $\mu_i$) resulted in the more spherical cross-section of the filament (characterized as the smaller difference between h and w). This observation suggested the faster filling of the low-viscosity ink (such as ABS30) than the high-viscosity ink (such as ABS60) into the space yielded by the moving nozzle before the recovery. The characterization of the dimension of the printed filaments is important to determine the distance between the adjacent layers in the vertical direction and lateral direction in DIW 3D printing. These parameters were used for determining the toolpath to design 3D objects and freeform objects.

Example 8: Results and Discussion—Effect of Nozzle Speed (v) on the Dimensions of the Filament (w, h)

Figure 6B:
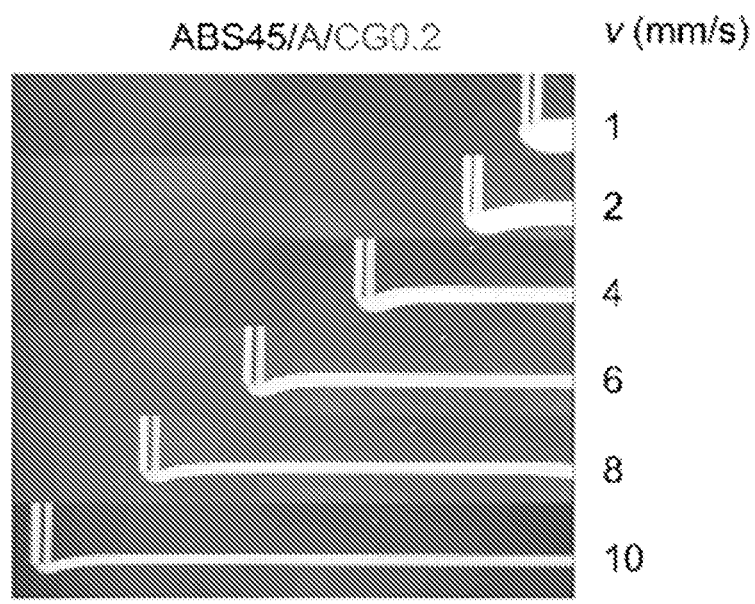
FIG. 6B shows effect of the nozzle speed (v) on the height of the printed filament (h) of ABS45, printed with (P, $d_i$)=(200 kPa, 510 μm) in CG0.2.
Figure 6C:
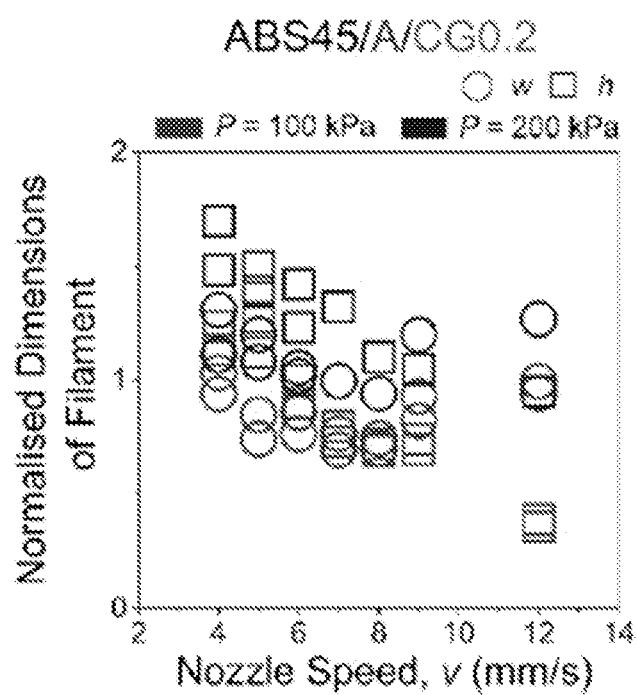
FIG. 6C plots for variations of (w, h) of ABS45 as a function of v in CG0.2. w and h were normalized with $d_i$=600 μm. The inks were printed with P=100 kPa and 200 kPa. For each v, the minimum and maximum values of w and h were plotted.

In extrusion-based printing, the speed of nozzle (v) is another variable to determine the dimension of the filament. At a given volumetric rate of flow through the nozzle (Q), v determined the mass of the ink dispensed per unit length (m); the amount of the ink then affected the dimensions of the filament. The effect of v on the measured dimensions of the printed filament (w, h) was investigated by printing ABS45 in CG0.2, CG0.6, and CG1.0 for v=4-12 mm/s. The printing parameters were (P, $d_t$)=(100 kPa, 600 µm) and (200 kPa, 600 µm). The optical images showed continuous dependence of h on v (FIG. 6B). The plots showing the normalized dimensions of the filament with respect to v are shown (FIG. 6C and FIG. 7—centre and right plots). Gradual decrease in (w, h) till v=9 mm/s was observed. Further increase in the nozzle speed (v>9 mm/s) resulted in unexpected printing behaviors characterized by large variances in (w, h). It is plausible that the increase in variance in (w, h) was due to the stretching of the printed filament by the moving nozzle. The increase in the applied pressure (P) for the same diameter of the nozzle ($d_i$=600 μm) exhibited similar trends between v and (w, h) with the increase in both w and h (FIG. 6C).

Figure 8:
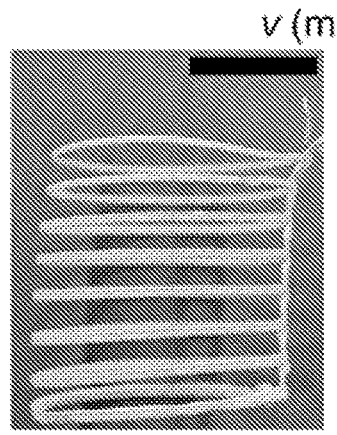
FIG. 8 demonstrates effect of the nozzle speed (v) on the dimensions of the printed filament (w, h) of ABS45. The left image is an optical micrograph of a helical coil structure of ABS45 printed in CG1.0. The image highlighted the effect of v on h of the printed filament, where each layer was printed at different v. The right is a plot between measured and predicted cross-sectional areas of the printed filament. The diagonal line corresponds to the relationship for the volume conservation (Q=πwhv*¼). Scale bar denotes 5 mm.
Figure 8:
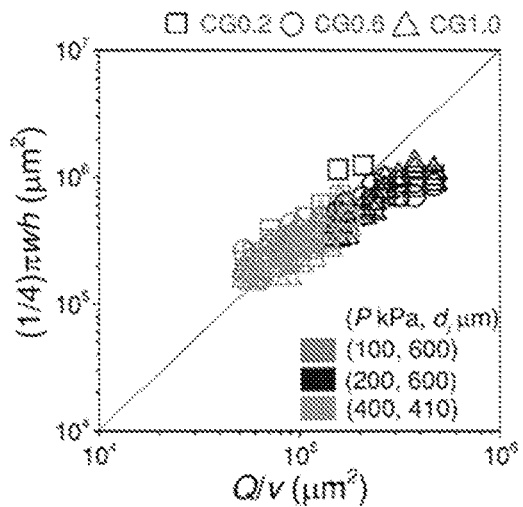

Correlation between the measured and predicted dimensions of the filament can be used to quantify the relationship between the rates of flow to the motion (Q and the dimensions of the filament (w, h). With the assumption to neglect the shrinkage of the printed ink, the conservation of the volume suggests Q=πwhv/4. ABS45 was printed in CG1.0 at different Q and v and measured the dimensions of the printed filaments (w, h). A plot of the measured cross-sectional area of the printed filaments (πwh/4) with respect to the predicted area (Q is shown v) (FIG. 8—right plot). The measured values nearly followed the trendline for the conservation of the volume (i.e. the 45° diagonal line). The behavior also confirmed that the printed filaments of ABS45 did not undergo major shrinkage during immersion precipitation, followed by the drying at room temperature.

Figure 9:
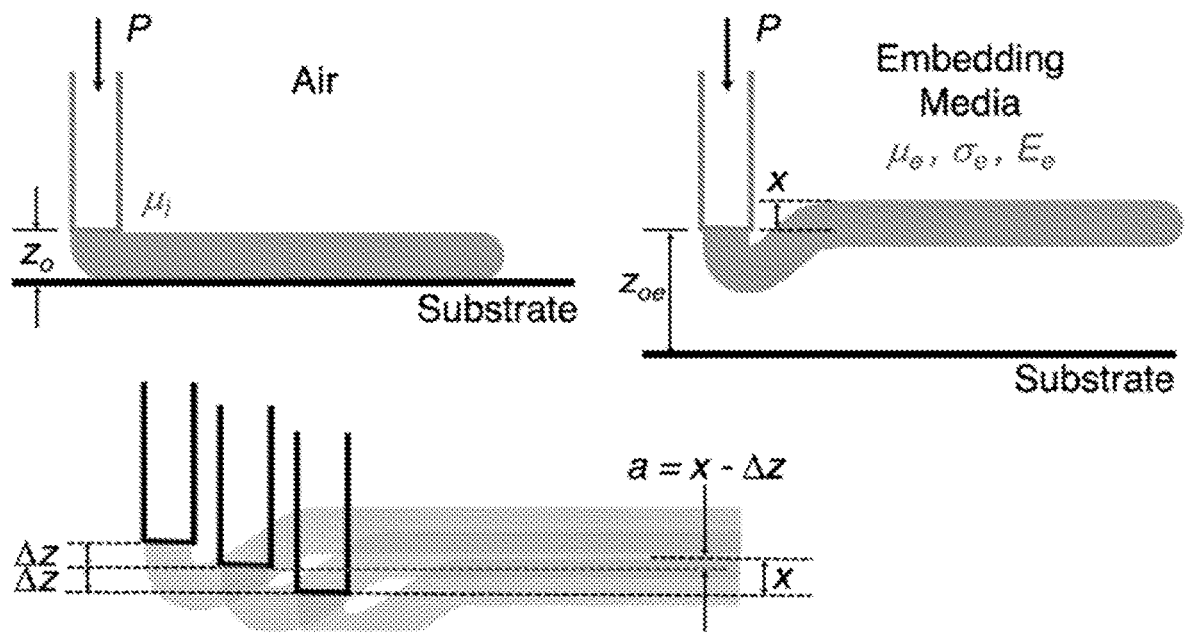
FIG. 9 depicts the path of the print ink at the exit of the nozzle when printed (top left image) on a solid substrate, and (top right image) in an embedding medium exhibiting yield stress characteristics. The dispensed filament was positioned at the designed toolpath (nozzle-to-substrate distance, $z_o$) when printed on a solid substrate. The filament was positioned above the substrate at $z_{oe}$ when printed within an embedding medium. The position of the upward-shifted filament depended on the viscosity of the ink and the yield stress characteristics of the embedding medium. It can be seen from bottom left image that the overlap (α) between the successive layers was calculated as α=x−Δz, where x was the vertical distance from the tip of the nozzle and the top surface of the printed filament, and $\Delta_z$ was the distance between the heights of the nozzle tip in the successive layers (bottom image), respectively.
Figure 10A:
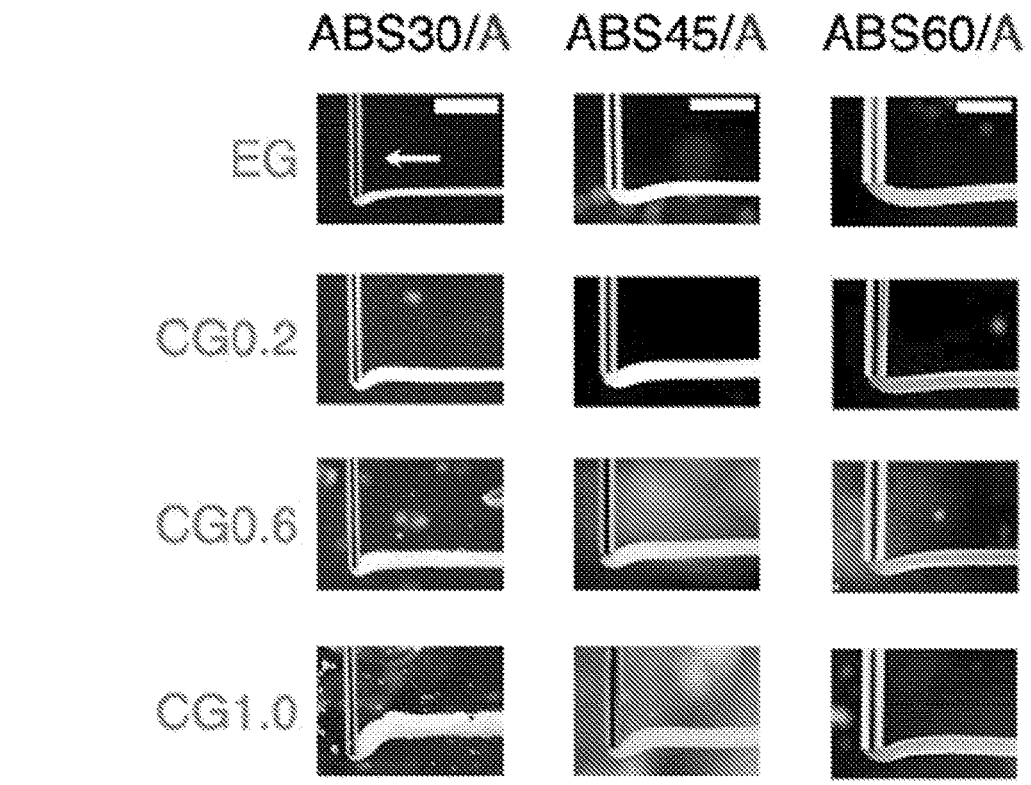
FIG. 10A depicts close-up images showing the effect of polymer concentration and embedding medium on the path followed by the ink at the exit of the nozzle. The arrow in white color indicates the direction of the moving nozzle for all images. Scale bars denote 2 mm.

Example 9: Results and Discussion—the Upward Displacement of the Printed Ink 3D printing in microparticulate embedding medium may result in the displacement of the printed filaments, unlike 3D printing on the substrate in the air (FIG. 9—top left and right images). Inks printed in highly viscous embedding medium follow an upwardcurved path at the exit of the nozzle. The inks are positioned above the designed toolpath (FIG. 9—top right image). Understanding such displacement is crucial in setting appropriate toolpaths in e3DP. The present example studied the effect of the rheology of the fluids on the behaviors of the ink exiting the nozzle; such behaviors influenced the vertical and lateral attachment of the printed layers. The optical images of the upward-curved path of three polymer inks (ABS30, ABS45, and ABS60) printed in four microparticulate gels (EG, CG0.2, CG0.6, and CG1.0) are shown (FIG. 10A). All inks exhibited upward-curved paths at the exit of the nozzle. The vertical displacement of the filament increased as the yield stress characteristics ($\sigma_y$, $E_e$) increased, and the viscosity of the ink ($\mu_i$) decreased (FIG. 10A). These results suggested that the microparticulate gels with the high yield stress characteristics experienced the fast zipping (i.e. recovery) after being unzipped by the motion of the nozzle. In contrast, the viscous inks resisted yielding to the external forces and tended to remain in the original location.

The displacement of the filament affected the vertical position of the printed ink behind the nozzle. We studied the change in the position of the printed ink by measuring the distance between the top surface of the printed ink and the tip of the nozzle (denoted as x, FIG. 10B, inset). The printing parameters were (P, v, $d_i$)=(50 kPa, 4 mm/s, 410 μm) for ABS30, (P, v, $d_i$)=(200 kPa, 4 mm/s, 510 μm) for ABS45, and (P, v, $d_i$)=(600 kPa, 1 mm/s, 810 μm) for ABS60. The shear rate at the end of the moving nozzle is given as $\dot{\gamma}$=v/$d_o$ (where $d_o$ is the outer diameter of the nozzle). The calculated shear rates were $\dot{\gamma}_1$=5.48 s$^{-1}$, $\dot{\gamma}_2$=4.88 s$^{-1}$ and $\dot{\gamma}_3$=0.94 s$^{-1}$ for ABS30, ABS45, and ABS60, respectively.

Figure 10B:
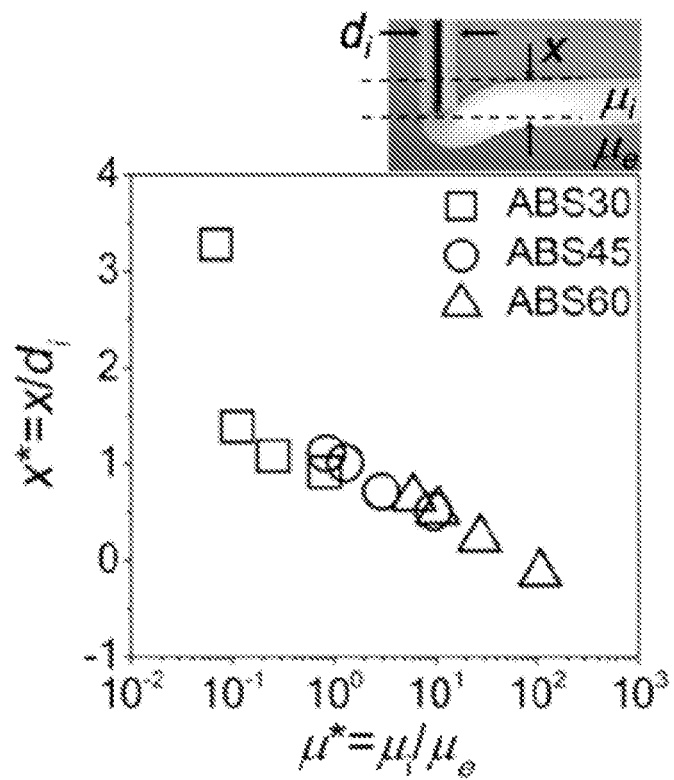
FIG. 10B is a plot of dimensionless distance (x*=x/$d_i$) as a function of dimensionless viscosity ($\mu^*=\mu_i/\mu_e$) the vertical distance from the tip of the nozzle and the top surface of the printed filament. $\mu_i$ and $\mu_e$ are the viscosity of the ink and embedding medium, respectively.
Figure 11:
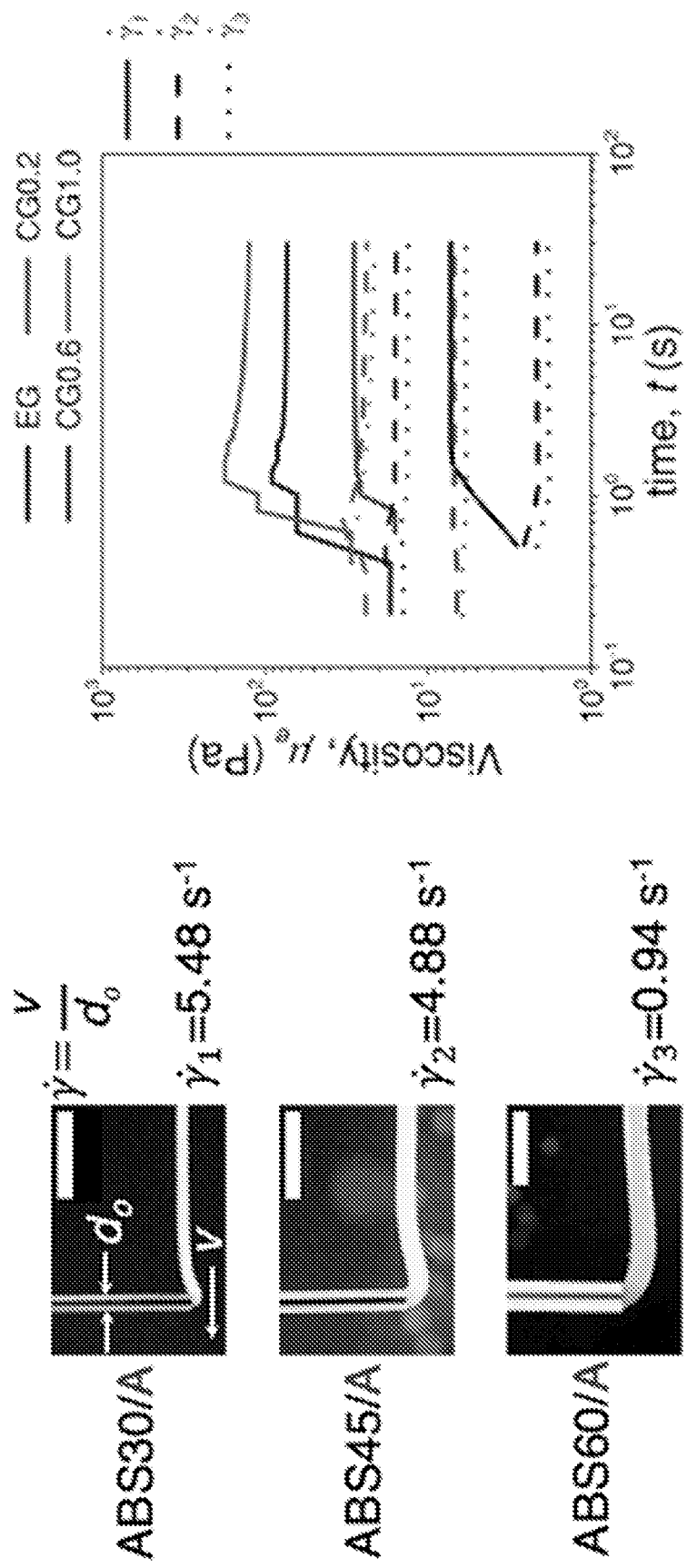
FIG. 11 demonstrates effect of the nozzle speed (v) on the fluidization in the embedding medium by the translating nozzle tip. The left image shows applied shear rate ($\dot{\gamma}$) by the translating nozzle in the embedding medium was calculated based on the relationship $\dot{\gamma}=v/d_o$, where $d_o$ is the outer diameter of the nozzle. $\dot{\gamma}$ of 5.48 $s^{-1}$, 4.88 $s^{-1}$ and 0.94 $s^{-1}$ were applied for the dispensing of ABS30, ABS45, and ABS60, respectively. The right is a plot of $\mu_e$ as a function of time (t) at constant $\dot{\gamma}_1$, $\dot{\gamma}_2$, and $\dot{\gamma}_3$. Scale bars denote 2 mm.

The moving nozzle sheared the embedding medium and altered the viscosity of the medium ($\mu_e$) in the yielded regions; the change in $\mu_e$ of EG, CG0.2, CG0.6, and CG1.0 was measured at constant $\dot{\gamma}_1$, $\dot{\gamma}_2$ and $\dot{\gamma}_3$, and (FIG. 11). Based on the values of $\mu_e$, the dimensionless vertical displacement of the filament (x*=x/$d_i$) was plotted as a function of dimensionless viscosity ($\mu$*=$\mu_i$/$\mu_e$, where $\mu_i$ was found in FIG. 1F) (FIG. 10B). The plot suggested the decreasing trend of x* with an increase in $\mu$*. The highest x* was observed for ABS30 in CG1.0 and the lowest x* was observed for ABS60 in EG. These observations agreed with the trend predicted qualitatively.

Example 10: Results and Discussion—the Vertical Attachment of the Printed Filaments Successful DIW 3D printing requires proper attachment between filaments in the adjacent layers. In a study of e3DP using liquid resins, the printed inks solidified by heat or light after printing the entire 3D object. In these examples, such printed liquid layers did not interrupt the subsequent printing because they remained in liquid. The overlap between the adjacent vertical layers allowed the attachment between them. FPP is different in that in situ solidification starts immediately when the polymer ink comes in contact with the surrounding medium. Therefore, the overlap between the successive layers (α=x−Δz, where $\Delta_z$ is the distance between the nozzle tip in the adjacent vertical layers) was selected carefully to avoid the disruption to the printing by the pre-existing solid or semi-solid layers (FIG. 9—bottom image).

Figure 10C:
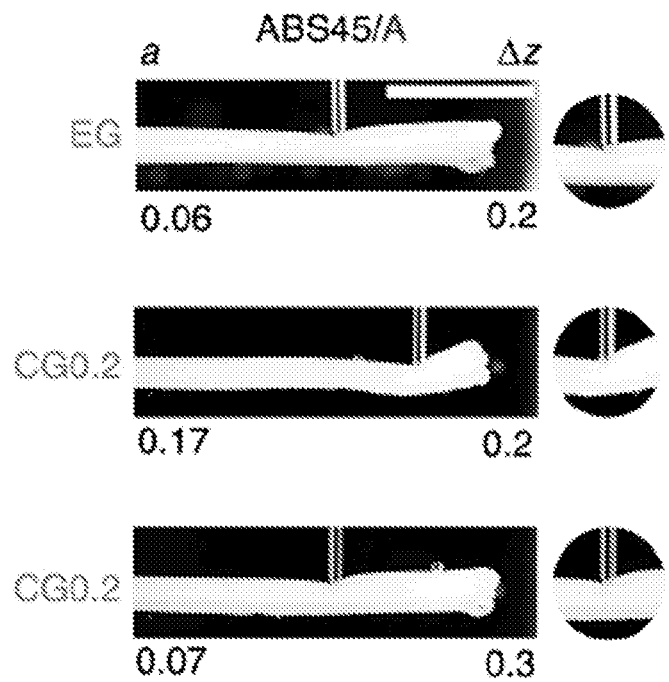
FIG. 10C depicts close-up images showing the effect of embedding medium, overlap between the successively printed filaments (α=x−Δz) and $\Delta_z$ on the vertical attachment of the layers of ABS45, printed with (P, v, $d_i$) (200 kPa, 4 mm/s, 510 μm). Scale bar denotes 5 mm.

To study the vertical attachment of the inks in FPP, printing of three to five layers of ABS45 and ABS60 in the four embedding media was carried out. The printing parameters were (P, v, $d_i$)=(200 kPa, 4 mm/s, 510 μm) and (P, v, $d_i$)=(600 kPa, 1 mm/s, 810 μm) for ABS45 and ABS60, respectively (FIG. 6A—right plot, FIG. 6B, and FIG. 13A to 13C). The overlap between the successive layers (α) was calculated by subtracting the nozzle displacement (Δz) from the displacement of the filament (x). For example, the vertical shift of ABS45 printed in EG was x=0.26 mm. It was observed that x remained the same for all four layers. The displacement of the nozzle was set as Δz=0.2 mm by programming the toolpath, and the overlap between the adjacent layers was α=0.06 mm. The printing of the new layer pushed the existing layers downward. Once the nozzle moved away, the pushed segment bounced back to its original position due to the elastic properties of the embedding media. Under this setting, successful printing of four layers of ABS45 in EG without disrupting the pre-existing layers was carried out (FIG. 10C).

Figure 12A:
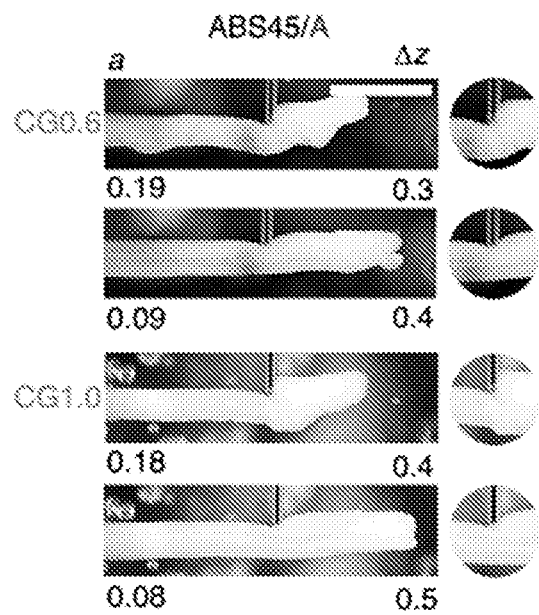
FIG. 12A depicts close-up images showing the effect of embedding medium, a and $\Delta_z$ on the vertical attachment of the layers of ABS45 printed with (P, v, $d_i$) (200 kPa, 4 mm/s, 510 μm).

The upward displacement of the printed filaments was larger for the embedded medium of the higher yield stress characteristics. The vertical shift of ABS45 in CG0.2 was measured as x=0.37 mm. With the same nozzle displacement (Δz=0.2 mm), the overlap between two layers was estimated as α=0.17 mm. With this overlap, the nozzle was stuck in the printed structure and disrupted the printing (FIG. 10C). Increasing the layer distance avoided this problem; the increase in the nozzle displacement (Δz=0.3 mm) gave the decreased overlap (α=0.07 mm). Under this condition, there was no disruption to the pre-existing layers (FIG. 10C). With similar considerations, ABS45 was successfully printed in the embedding medium with high yield stress characteristics (FIG. 12A; Δz=0.4 mm in CG0.6 and Δz=0.5 mm in CG1.0).

These experiments highlighted the importance of selecting appropriate $\Delta_z$ in embedding medium with different yield stress characteristics.

Figure 10D:
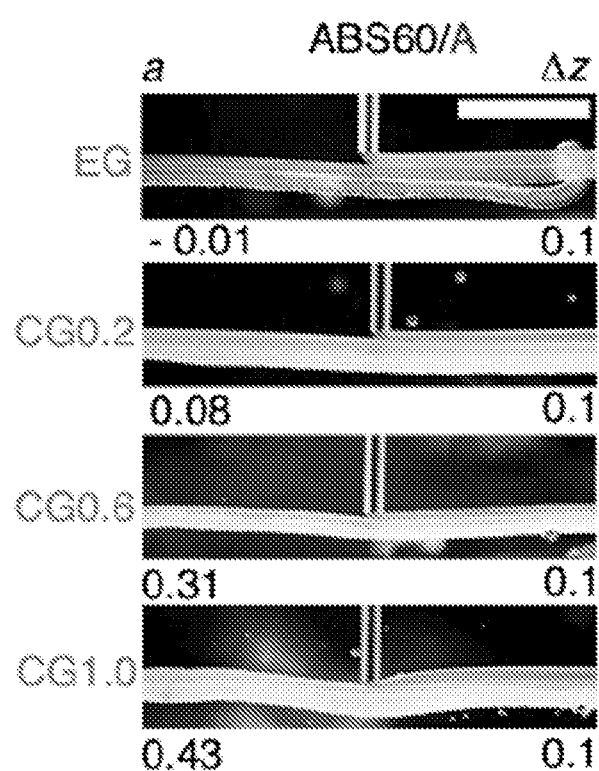
FIG. 10D depicts close-up images of the printed filaments of ABS60 with Δz=0.1 mm showing elastic deformation in four embedding media, printed with (P, v, $d_i$)=(600 kPa, 1 mm/s, 810 μm). ABS60 printed in EG formed a gap between the layers because the filament was not displaced upward. Scale bar denotes 5 mm.

It was also found that rapidly solidifying inks was advantageous in building 3D structures in FPP. For example, high polymer concentration in ink (ABS60) allowed the rapid precipitation of the polymer. In such cases, the moving nozzle was not stuck in the printed layers; the moving nozzle merely pushed the solidified pre-existing layers downward regardless of the overlap (α) between the filaments. Because of this difference, multiple layers of ABS60 were readily printed in CG0.2, CG0.6, and CG1.0 without the need to adjust the nozzle displacement (Δz=0.1 mm used for all three embedded media; FIG. 10D). This demonstration suggested that the feasibility of the 3D printing did not depend on the nozzle displacement (Δz) for rapidly solidifying inks, which was practically advantageous in selecting the printing conditions.

Figure 12B:
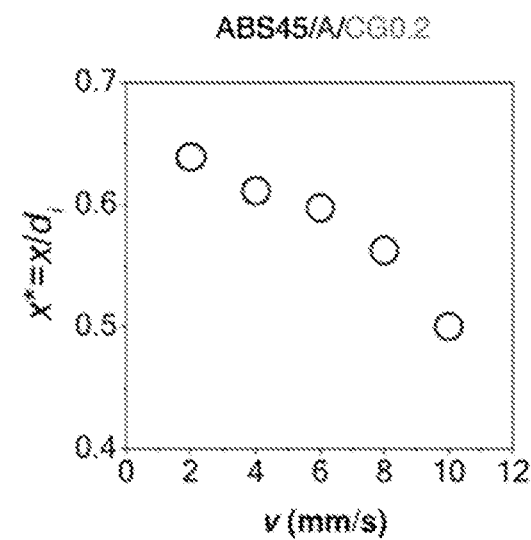
FIG. 12B depicts effect of the nozzle speed (v) on the vertical distance from the tip of the nozzle and the top surface of the printed filament (x) of ABS45, printed with (P, $d_i$)=(200 kPa, 510 μm) in CG0.2.
Figure 12C:
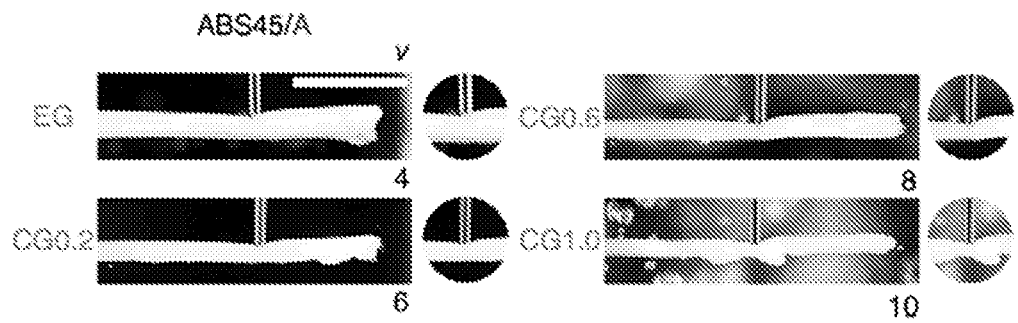
FIG. 12C depicts close-up images showing successful vertical attachment of the layers of ABS 45 printed with (P, $d_i$, Δz)=(200 kPa, 510 μm, 0.2 mm). The attachment was achieved by controlling v in each embedding medium. Scale bar denotes 5 mm.

Finally, the speed of the nozzle was identified as another parameter that helps ensure the vertical attachment of the filaments. Earlier, the dependence of (w, h) on v in FPP (FIG. 6C) was discussed. Indeed, the present experiments also revealed the dependence of x on v, which then influenced the overlap between the successively printed inks (FIG. 12B). This observation suggested that the vertical attachment of the filaments is controlled by v. To verify this hypothesis, three layers of ABS45 was printed in four embedding media (EG, CG0.2, CG0.6, and CG1.0). The change in v allowed compensating for the different displacement of the filaments to achieve vertical attachment of the filaments (FIG. 12C). These experiments suggested that v (in addition to Δz) is a variable for FPP.

In addition, the value of x* was the lowest for ABS60 in EG among all experimental conditions we studied. It was observed that x=−0.11 mm when ABS60 was printed in EG. The minus (−) sign indicated that the top surface of the printed filament was below the tip of the nozzle (FIG. 10A to 10B and FIG. 9). In this arrangement, when printed with Dz=0.1 mm, the adjacent layers did not attach to each other (FIG. 10D). In CG0.2, the displacement was x=0.18 mm and the overlap was α=0.08 mm. Under this condition, the previously printed layers was not disrupted by the moving nozzle. In CG1.0, the displacement was x=0.53 mm and the overlap was α=0.43 mm. Despite a large overlap, however, the printing was not disrupted by the nozzle due to rapid solidification of ABS60 (FIG. 10D).

Overall, it is discussed herein the vertical attachment of the printed filaments in the embedding medium. The filaments printed in embedding medium were shifted upward due to the yield stress characteristics of the embedding medium. In order to ensure the attachment of the layers, it is necessary to select an appropriate toolpath (Δz) and a nozzle speed (v). $\Delta_z$ directly influenced the overlap between the successive layers. The overlap between the layers was necessary to achieve the attachment between the layers. Large overlap was not adequate when printing slowly solidifying inks (such as ABS45) as the moving nozzle could disrupt the pre-existing layers. In contrast, rapidly solidifying inks (such as ABS60) was adequately patterned without adjusting Δz, which was practically straightforward.

Example 11: Results and Discussion—the Lateral Attachment of the Printed Filaments Lateral attachment (or side-by-side attachment) of the printed filaments may be necessary for 3D printing involving filled structures. The lateral fusion of the printed ink of liquid polysiloxanes in a hydrophilic microparticulate embedding medium was reported to be challenging. Similar to the vertical attachment of the printed layers, the adjacent filaments have to spatially overlap to attach side-by-side. For the lateral attachment, the distance between two adjacent toolpaths should be smaller than the width of the printed filaments to ensure the contact between the adjacent filaments.

Figure 13A:
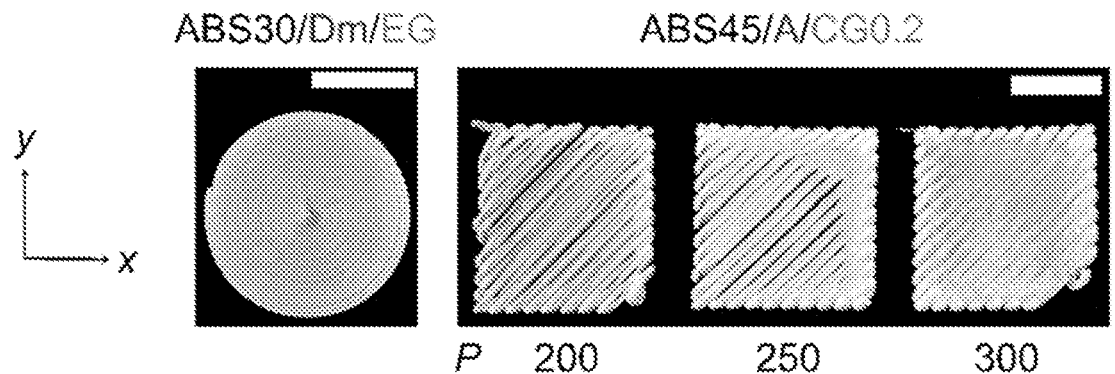
FIG. 13A left image depicts a circular pattern of ABS30 showing the lateral attachment of the printed layers in EG, printed with (P, v, $d_i$)=(50 kPa, 10 mm/s, 410 μm). The distance between the two layers was 0.3 mm. The right image shows effect of applied pressure (P) on the lateral attachment of the printed layers of ABS 45 in CG0.2, printed with (v, $d_i$)=(3 mm/s, 410 μm). The distance between the two layers was 0.4 mm. Scale bars denote 1 cm.
Figure 13B:
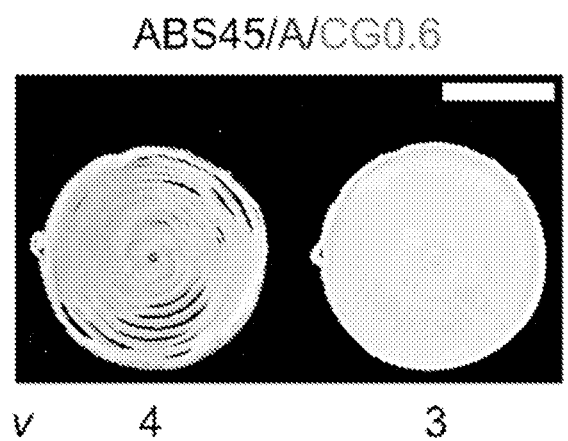
FIG. 13B shows effect of the nozzle speed (v) on the lateral attachment of the printed layers of ABS45 in CG0.6, printed with (P, $d_i$)=(200 kPa, 410 μm). The distance between the two layers was 0.3 mm. Scale bar denotes 1 cm.
Figure 13C:
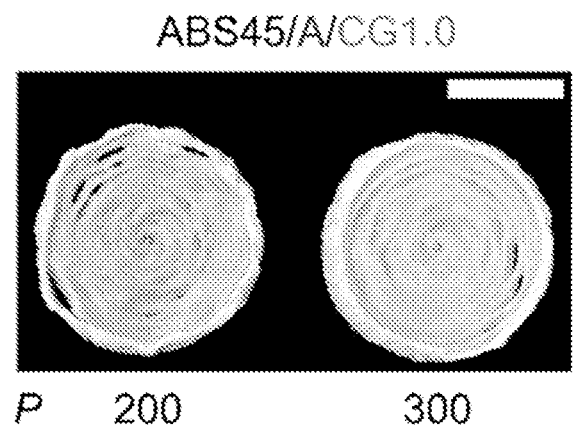
FIG. 13C shows effect of applied pressure (P) on the lateral attachment of the printed layers of ABS 45 in CG1.0, printed with (v, $d_i$) (3 mm/s, 410 μm). The distance between the two layers was 0.3 mm. Scale bar denotes 1 cm.
Figure 15A:
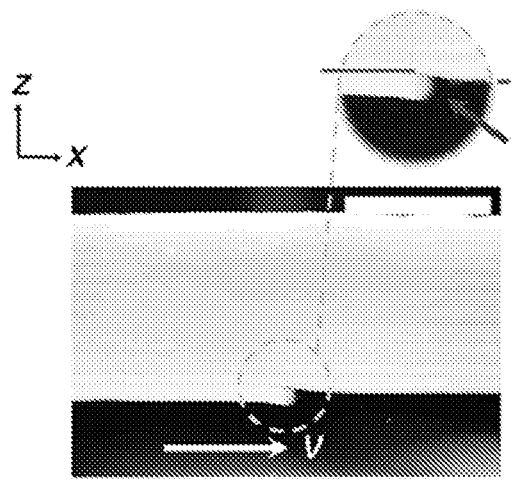
FIG. 15A shows the moving nozzle (a 90°-bent nozzle shown by an arrow in the inset, which was originally red colored) with a speed of v displacing the previously printed layer of ABS45 in CG0.2. The moving nozzle displaced the previously printed layer from its original position (highlighted in the inset with the solid and dashed lines, which were originally red colored). Scale bar denotes for 5 mm.
Figure 15B:
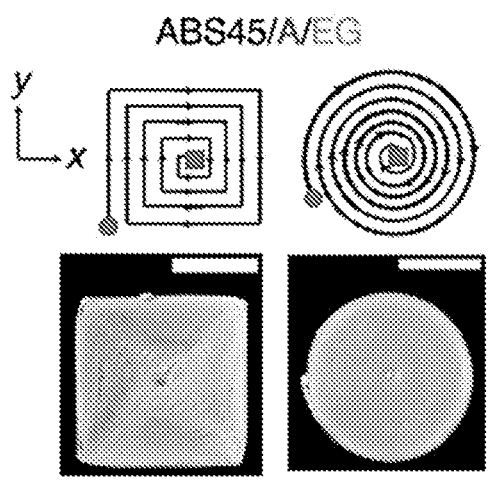
FIG. 15B shows a rectangular and a circular pattern of ABS45 showing the lateral attachment of the printed layers in EG. Scale bar denotes for 1 cm.
Figure 15C:
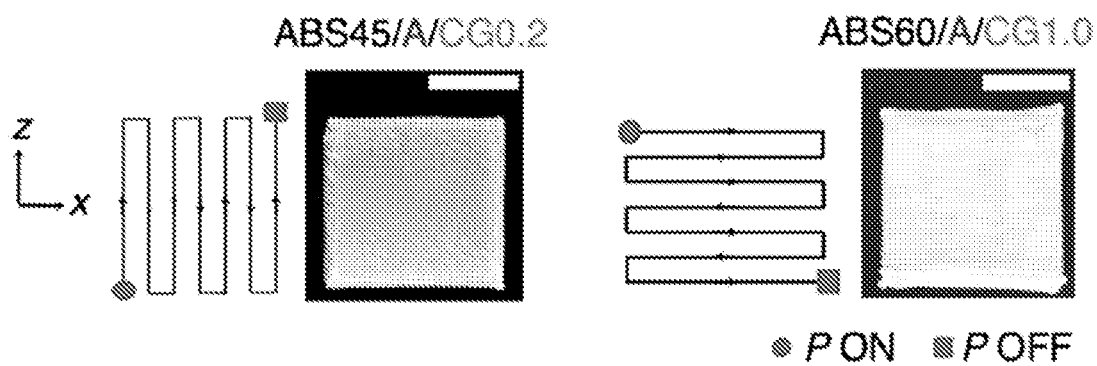
FIG. 15C shows rectangular patterns of ABS60 showing the lateral attachment of the printed layers in CG1.0. The printing parameters of ABS45 and ABS60 were (P, v, $d_i$)=(200 kPa, 4 mm/s, 410 μm) and (P, v, $d_i$)=(600 kPa, 1 mm/s, 810 μm), respectively. The distance between the two layers was 0.3 mm. The circle and square (originally blue colored) are the start and end point of the toolpath, respectively.

To study the lateral attachment of the printed filaments, the examples printed parallel lines of ABS30, ABS45, and ABS60 in the embedding media (FIGS. 15A to 15C and 13A to 13C). First, ABS45 was printed in CG0.2. With the printing parameters of (P, v, $d_i$)=(100 kPa, 3 mm/s, 410 μm), the attachment (FIG. 13A—right image) was not initially observed. The width of the printed filament (w=0.28 mm) was smaller than the set distance between the adjacent toolpath of 0.4 mm. In this case, gaps were formed between the two lines. The examples tested two ways to ensure the lateral attachment of the filaments by (1) increasing P and (2) decreasing in v (FIG. 15A to 15C); the examples have verified both P and v allowed controlling w (FIG. 6C). The increase in w of the printed filament ensured the spatial overlap of the adjacent filaments and permitted the lateral attachment. For better visualization and imaging of the spatial overlap of the adjacent filaments, a 90°-bent nozzle was used for printing. The adjacent filaments in a rectangular pattern were in contact, indicated by the elastic deformation of the previously printed filament (FIG. 15A). It was also observed that the lateral attachment of the filaments in CG1.0 was difficult to control as indicated by the formation of the gaps (FIG. 13C). Two reasons were identified for this observation. Firstly, the width of the filament tended to be small in embedded medium with high yield-stress characteristics (FIG. 6A—centre image). Secondly, the displacement of the embedding medium from the space between the adjacent filaments also requires sufficiently high shear stress. The highest yield stress characteristics, characterized as the largest values of ($\sigma_y$, $E_e$), of CG1.0 made it difficult to achieve the spatial overlap of the adjacent filaments. Nevertheless, with adequate dispensing parameters (v and P), FPP permitted fabricating fully-filled horizontal patterns with the lateral attachment (FIGS. 15B and 15C).

Figure 14A:
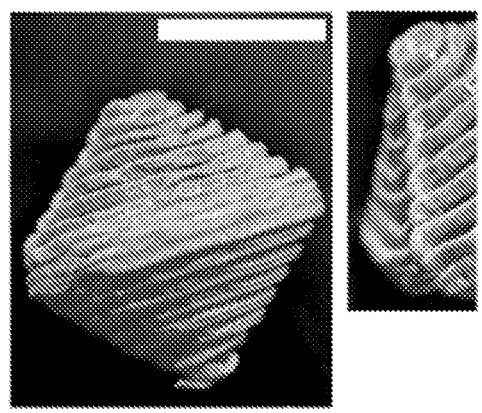
FIG. 14A shows a 3D model of ABS by FPP in CG1.0. Scale bar denotes 1 cm.
Figure 14B:
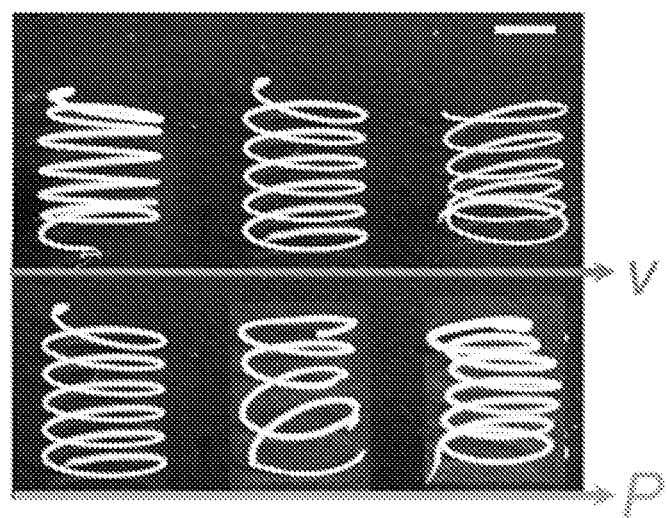
FIG. 14B shows a 3D model of PLA by FPP in EG. Scale bar denotes 1 cm.
Figure 16A:
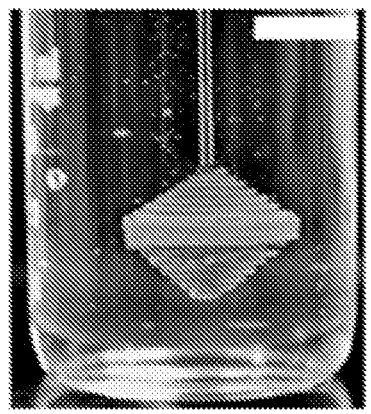
FIG. 16A shows freeform and overhang structures of thermoplastics fabricated by FPP using ABS60, printed with (P, v, d)=(600 kPa, 1 mm/s, 810 μm). Scale bars denote 1 cm.
Figure 16A:
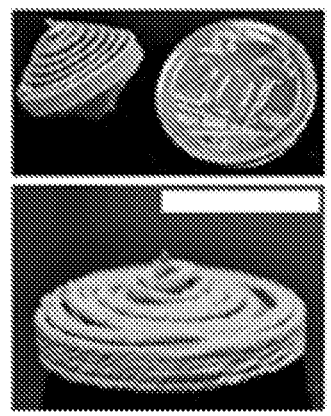
Figure 16A:
Figure 16B:
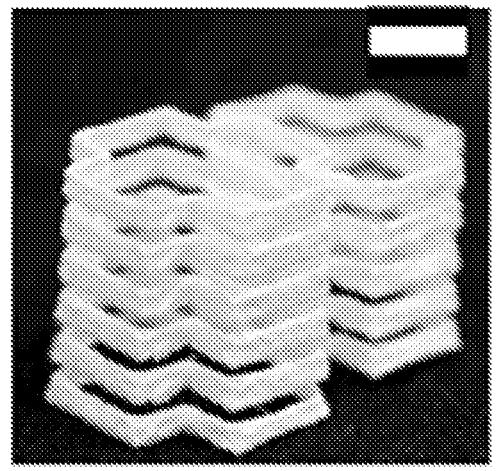
FIG. 16B shows freeform and overhang structures of thermoplastics fabricated by FPP using ABS45, printed with (P, v, $d_i$)=(200 kPa, 4 mm/s, 510 μm). Scale bar denotes 1 cm.
Figure 16C:
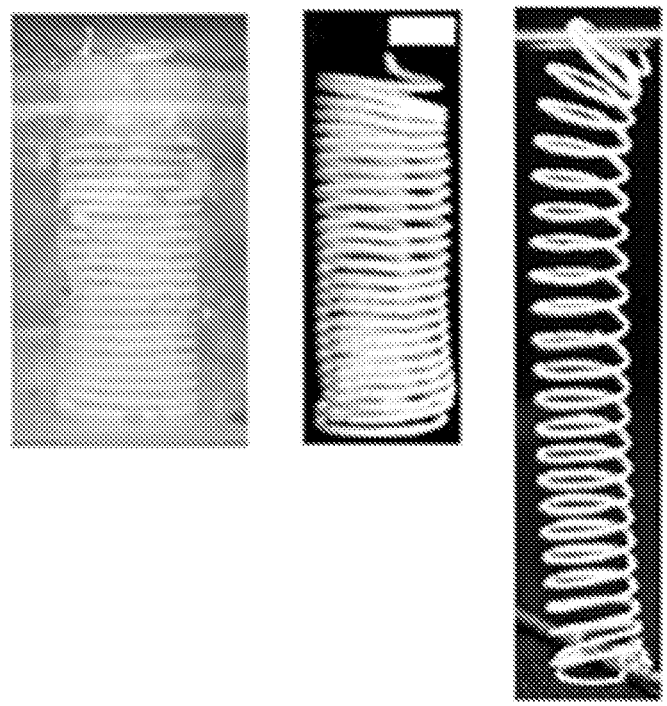
FIG. 16C shows freeform and overhang structures of thermoplastics fabricated by FPP using HIPS30. Scale bar denotes 1 cm.
Figure 16D:
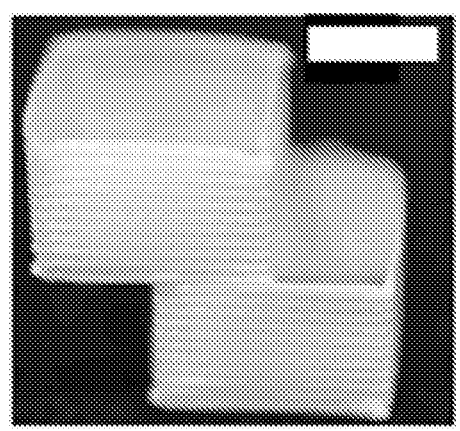
FIG. 16D shows freeform and overhang structures of thermoplastics fabricated by FPP using PE40. Scale bar denotes 1 cm.
Figure 16E:
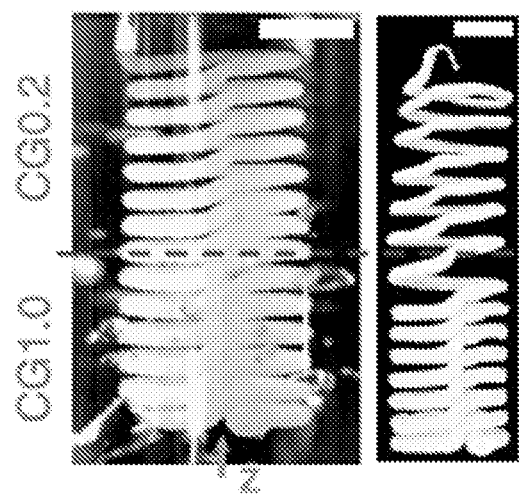
FIG. 16E shows freeform and overhang structures of thermoplastics fabricated by FPP using ABS60, printed with (P, v, d)=(600 kPa, 1 mm/s, 810 μm). Scale bars denote 5 mm.

Example 12: Results and Discussion—Formation of Freeform and Overhang Structures In FPP, the yield stress characteristics of the embedding medium provided physical support to the printed structures and enabled freeform fabrication via in situ solidification. In contrast to SC3DP that demonstrated freeform fabrication with the stringent requirement for the ink properties (FIG. 1I), FPP enabled the use of low viscosity inks (with low-polymer concentrations) in various solvents. The freeform, overhang, and porous structures patterned by FPP (FIG. 16A to 16E and FIG. 14A to 14B) were summarized. With appropriate selection of the solvents, polymers, and embedding media, freeform helices and 3D models with overhang geometries were fabricated. Complex solid shell structures consisting of three parts of ABS60 in CG0.2 and CG1.0 with (P, v, $d_i$)=(600 kPa, 1 mm/s, 810 μm) (FIGS. 16A and 14A) were printed. An inverted cone (bottom part), a cylindrical tube (middle part), and a cone (top part) were printed in sequence. The bottom and top cones were printed with Δz=0.3 mm, and the middle circular tube was printed with Δz=0.1 mm. The nozzle followed a circular path and then moved upwards with fixed Δz. Δz=0.3 mm was chosen to print the top and bottom cones to have sufficient spatial gaps between the adjacent layers; this arrangement ensured the model without the vertical attachment. After completing the printing, the structure was kept in the support medium for 30 mins to complete the solidification via immersion precipitation. Finally, some table salt (mostly consisting of sodium chloride, NaCl) were added over the embedding medium; the addition of NaCl converted the embedding medium into a low-viscosity liquid for easy removal of the printed structure. As the printed layers of the cones did not form vertical attachments, they initially collapsed to form a flat disk-like structure and extended in the form of the helical coil (FIG. 16A). In contrast, when the same structure was printed in CG1.0 with the same parameters, the printed layers were vertically attached without collapsing. This difference can be attributed to an increase in h of the printed filaments with the large yield stress characteristics in CG1.0. To highlight the effect of the embedding medium on the printed object, a cylindrical tube of ABS60 was printed in a bath consisting of two CGs; the lower half was CG1.0, and the upper half was with CG0.2 (FIG. 16E). This experiment showed the dependence of the attachment of the printed filaments on the surrounding medium. The printed layers of ABS60 in CG1.0 were firmly attached at the point where the nozzle moved upwards, while the layers printed in CG0.2 were largely separated (FIG. 16E).

Figure 17A:
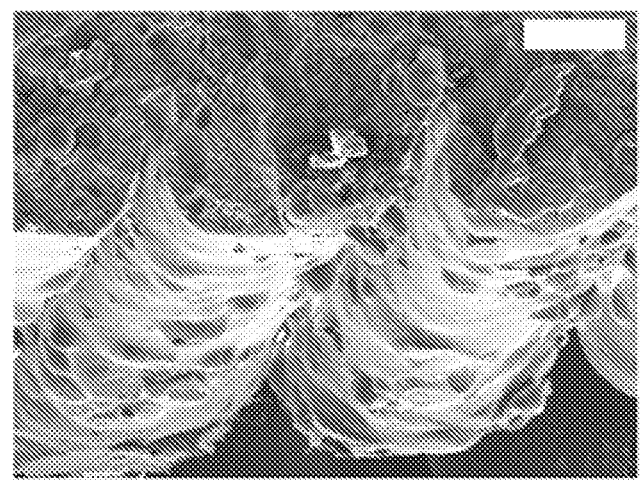
FIG. 17A is a scanning electron microscopy (SEM) image of the internal microstructure of the fracture surface of the starch reinforced CAP30 printed in CG0.6. Scale bar denotes 100 μm.
Figure 17B:
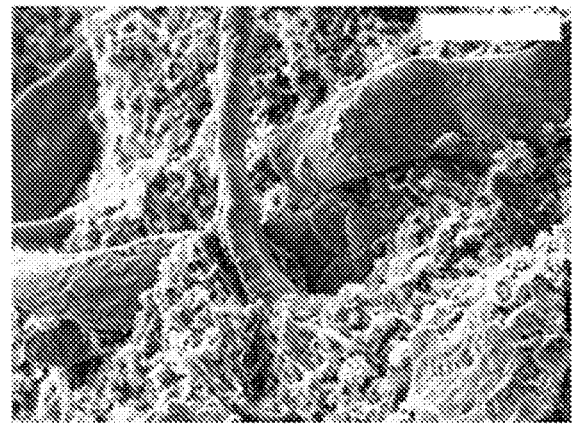
FIG. 17B is a SEM image of the internal microstructure of the fracture surface of the α-Cellulose (αC)-reinforced PCL40 printed in EG. Scale bar denotes 50 μm.
Figure 17C:
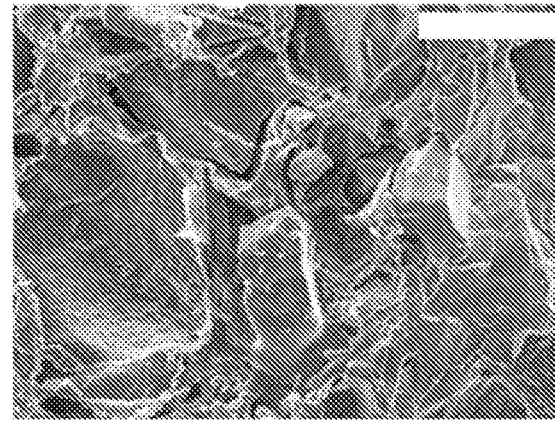
FIG. 17C is a SEM image of the internal microstructure of the fracture surface of the laponite clay (LP)-reinforced ABS45 printed in CG0.2. Scale bar denotes 50 μm.

As shown, FPP permitted fabricating freeform and overhang structures consisting of materials not compatible with other methods of 3D printing. For example, FDM 3D printing of cellulose-ester derivatives has been challenging because their melting points are close to their decomposition temperature. 3D printing of cellulose acetate (CA) has been demonstrated in literature but with and limited printing conditions. FPP largely relaxed the requirement for the printing conditions. The liquid nature of the inks permitted to include solid additives to the ink for functionalization. Starch, α-cellulose (αC), and laponite clay (LP) as additives in the polymer inks (FIG. 17A to 17C). Overall, it is herein demonstrated the versatility of FPP in fabricating freeform and overhang structures of various polymers, copolymers, and polymer composites.

Example 13: Results and Discussion—Microporous Freeform Structures

Figure 18A:
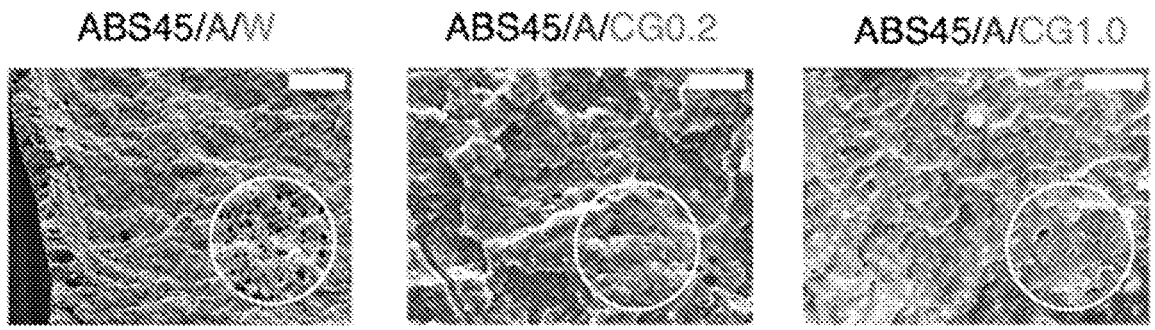
FIG. 18A shows SEM images of ABS45 printed by FPP in water (W), CG0.2 and CG1.0. Scale bars denote 20 μm.
Figure 18B:
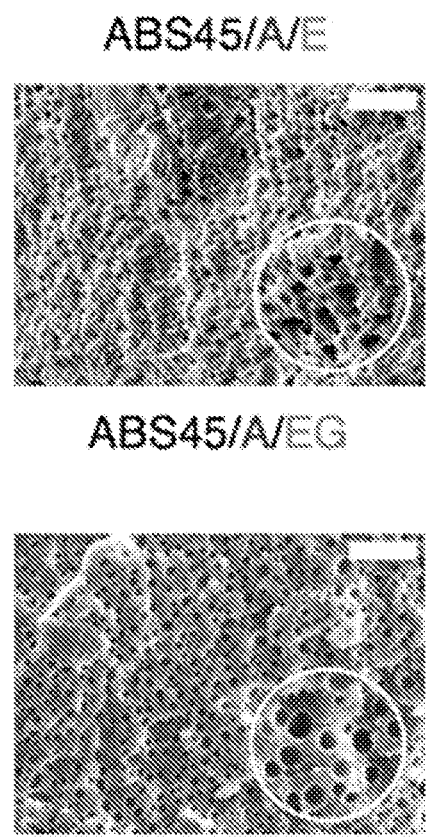
FIG. 18B shows SEM images of ABS45 printed in ethanol (E) and EG. Scale bars denote 20 μm.
Figure 18C:
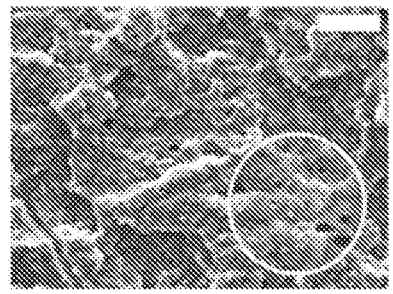
FIG. 18C shows SEM images of ABS45, and ABS45 with polyethylene glycol (PEG) (40% of the weight of ABS, PEG40), printed in CG0.2. Scale bars denote 20 μm.
Figure 18C:
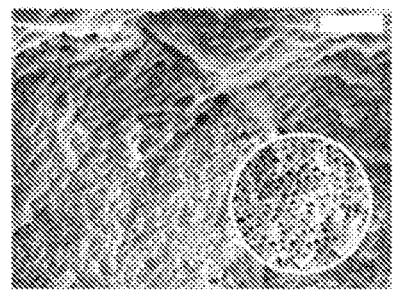
Figure 18D:
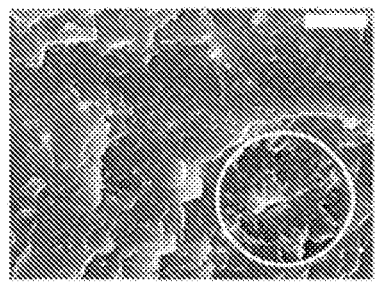
FIG. 18D shows SEM images of ABS60, and ABS60 with PEG (20% of the weight of ABS, PEG20), printed in CG0.6. Scale bars denote 20 μm.
Figure 18D:
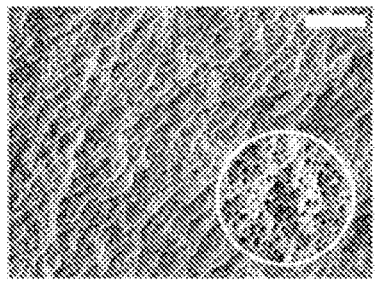

FPP is based on in situ immersion precipitation, and the fabricated 3D models can possess nano-to-microporous structures. Similarly to ip3DP, this is a distinctly unique method to fabricate porous 3D models by extrusion-based digital fabrication. The diffusion rates between the solvent and the nonsolvent allow controlling porous structures due to immersion precipitation. It is herein demonstrated that the diffusion rate could be readily changed by (1) viscosity of the embedding medium ($\mu_e$) and (2) polymeric additives (porogens in liquid state) to the ink. Altered diffusion rates between the solvent and nonsolvent resulted in varying pore size and density of the 3D printed structures. We investigated the effect of $\mu_e$ (zero-shear viscosity of the embedding medium) on the porosity of the printed structures. ABS45 was printed in water ($\mu_e$~$10^{-3}$ Pa·s), CG0.2 ($\mu_e$=305 Pa·s) and CG1.0 ($\mu_e$=1023 Pa·s) (FIG. 18A). ABS45 in water gave a few isolated pores (FIG. 18A). With an increase in $\mu_e$ (CG0.2), less isolated pores, smaller in sizes than ABS45 in water, were observed (FIG. 18A). Further increase in $\mu_e$ (CG1.0) gave only a few isolated pores (FIG. 18A). Similarly, ABS45 in ethanol ($\mu_e$~ 10-3 Pa·s) gave a sponge-like microstructure (FIG. 18B) due to the rapid extraction of the acetone into ethanol. With EG ($\mu_e$=72 Pa·s) as the embedding medium, we observed few isolated pores smaller in sizes than in ethanol (FIG. 18B). Adding porogens to the printing ink promoted the formation of the porous structures. The present experiments suggested that the addition of PEG (40% of the weight of ABS) permitted increasing the porosity of the printed structure (FIG. 18C to 18D).

Figure 19A:
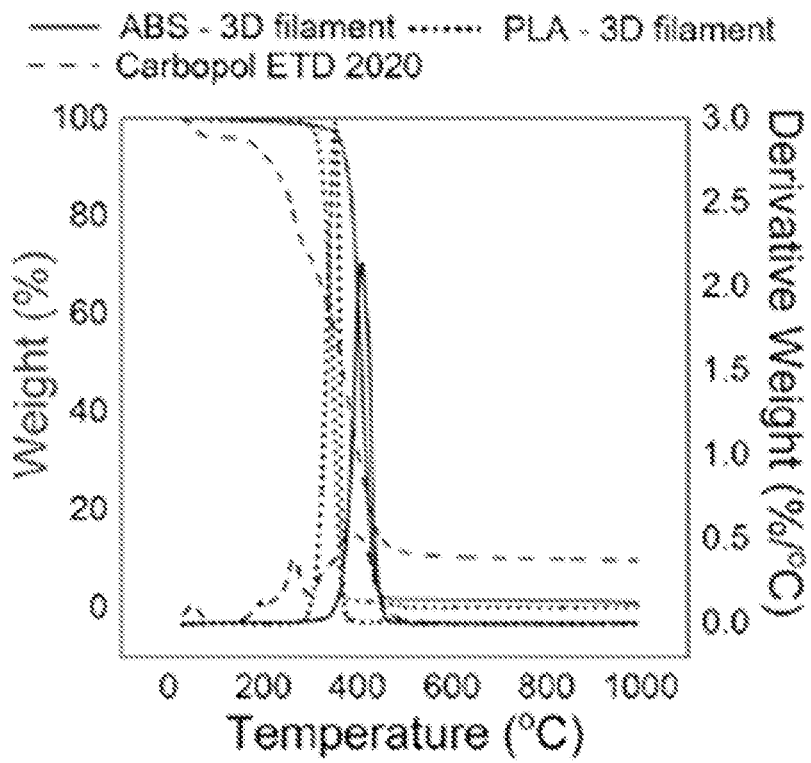
FIG. 19A shows thermogravimetric analysis (TGA) to study the presence of the residual solvent or nonsolvent in the fabricated 3D structures by FPP. Weight (%) and derivative of weight (%/° C.) are shown a function of the temperature for the following samples. Specifically, FIG. 19A demonstrates for 3D filament of ABS, 3D filament of PLA and Carbopol ETD 2020.
Figure 19B:
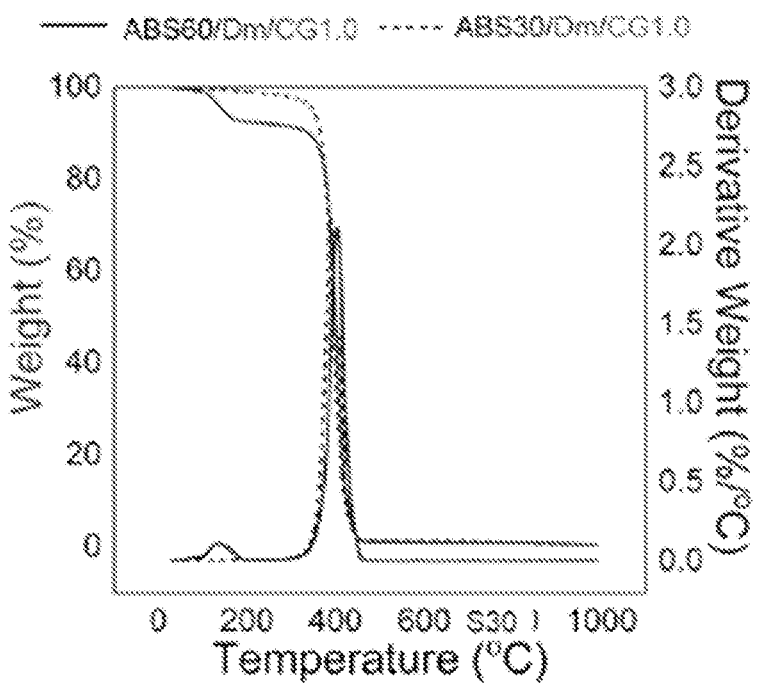
FIG. 19B shows thermogravimetric analysis (TGA) to study the presence of the residual solvent or nonsolvent in the fabricated 3D structures by FPP. Weight (%) and derivative of weight (%/° C.) are shown a function of the temperature for the following samples. Specifically, FIG. 19B demonstrates for ABS45/CG0.6/W with $t_r$=60 mins.
Figure 19C:
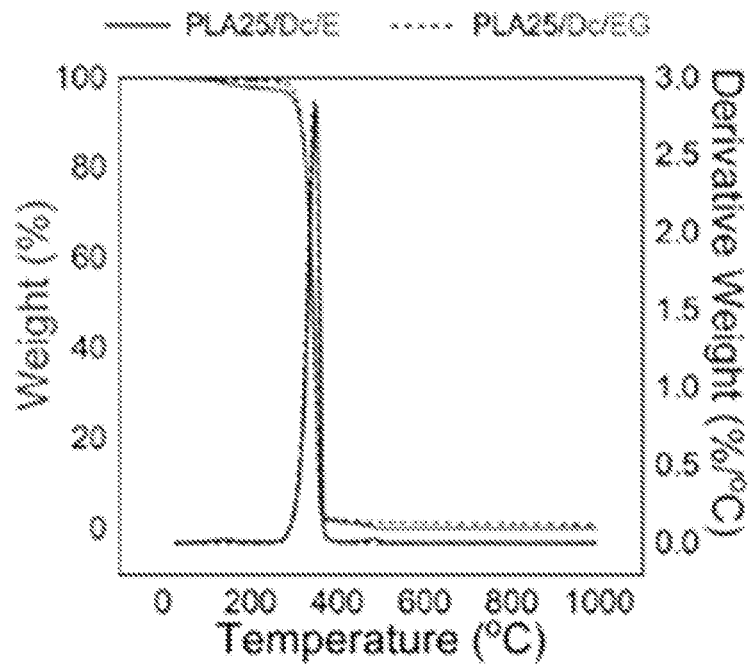
FIG. 19C shows thermogravimetric analysis (TGA) to study the presence of the residual solvent or nonsolvent in the fabricated 3D structures by FPP. Weight (%) and derivative of weight (%/° C.) are shown a function of the temperature for the following samples. Specifically, FIG. 19C demonstrates for PLA25/DCM/E and PLA25/DCM/EG with $t_r$=60 mins.

After the printing, the printed 3D structures were kept immersed in the embedding medium to ensure the extraction of the solvent from the polymer ink to the surrounding medium. Complete extraction of the solvents in the printed structure was confirmed using the thermogravimetric analysis (TGA) (FIG. 19A to 19E). ABS45 printed in water and CG0.6 resulted in the rapid extraction of the solvent. The printed object was immersed in water and CG0.6 for 60 mins (that it was called residence time, $t_r$=60 min). We confirmed the absence of the residual acetone, water, and CG in the printed models, as suggested by the TGA spectra of pristine ABS and the sample (FIGS. 19A and 19B). Similarly, the complete extraction of the solvent was observed for ABS60 printed in CG0.6. It was also confirmed the removal of organic solvents by ethanol and EG; PLA dissolved in dichloromethane (DCM) (PLA25/Dc) was α representative combination for the rapid extraction of organic solvents to ethanol and EG ($t_r$=60 mins) (FIG. 19C). The residual solvent, if any, evaporates at ambient conditions because acetone and DCM have high vapor pressure at room temperature.

Figure 19D:
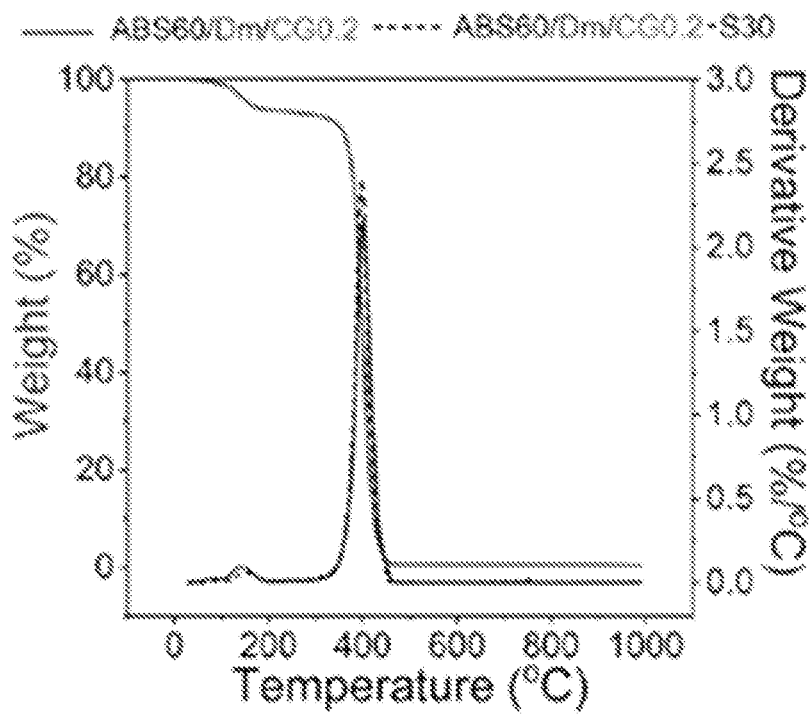
FIG. 19D shows thermogravimetric analysis (TGA) to study the presence of the residual solvent or nonsolvent in the fabricated 3D structures by FPP. Weight (%) and derivative of weight (%/° C.) are shown a function of the temperature for the following samples. Specifically, FIG. 19D demonstrates for ABS60/DMF/CG0.2 with $t_r$=60 mins. ABS60/DMF/CG0.2-S30 was with additional sonication in water for 30 mins.
Figure 19E:
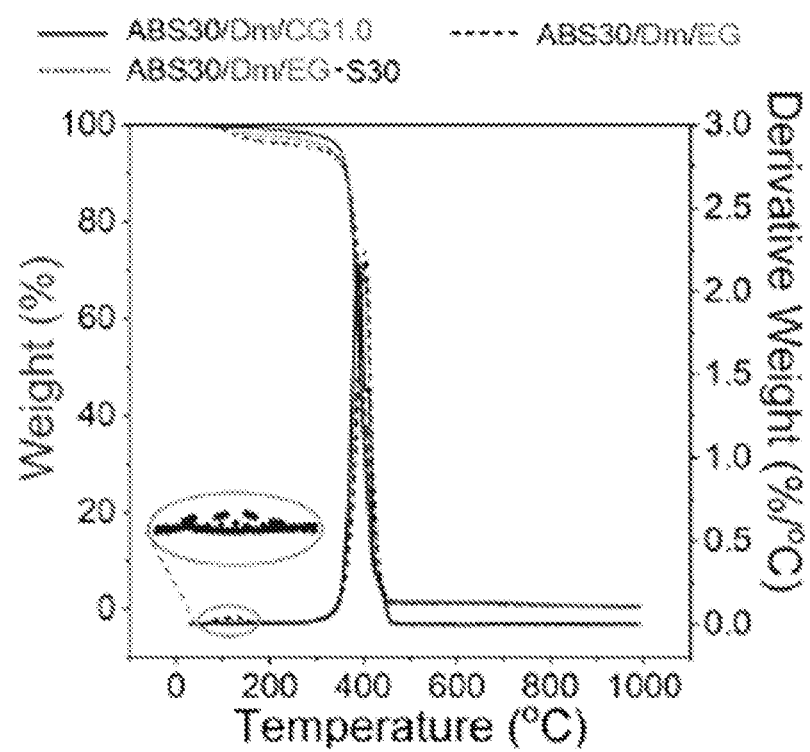
FIG. 19E shows thermogravimetric analysis (TGA) to study the presence of the residual solvent or nonsolvent in the fabricated 3D structures by FPP. Weight (%) and derivative of weight (%/° C.) are shown a function of the temperature for the following samples. Specifically, FIG. 19E demonstrates for ABS30/DMF/CG0.2 and ABS30/DMF/EG with $t_r$=60 mins. ABS30/DMF/EG-S30 was with additional sonication in ethanol for 30 mins.

The present examples also studied the extraction of low-vapor pressure solvents using TGA. ABS was dissolved in DMF (ABS60/Dm) and printed in CG0.2 and kept in the bath for 60 mins. The measurement by TGA suggested residual DMF was present in the printed model (FIG. 19D). The residual DMF can be further reduced by sonicating the printed model in water (ABS30/DMF/CG0.2-S30), where S30 denotes sonication of the printed model for 30 min (FIG. 19D). DMF is miscible with both water and ethanol but with different rates of diffusion. To illustrate the effect of the nonsolvent type (i.e., water or ethanol) on the extraction of the solvent, ABS30/Dm was printed in CG0.2 and EG. The printed object was immersed for 60 mins. The measurements by TGA suggested no residual DMF in the printed model when printed in CG0.2 (FIG. 19E). In contrast, the printed model in EG showed incomplete extraction of the solvent. This observation suggested faster diffusion of DMF in CG0.2 than in EG. The residual DMF was removed by sonicating the printed model in ethanol for 30 min (ABS30/DMF/EG-S30) (FIG. 19E). Overall, the extraction of the solvents from the printed models depends on the vapor pressure of the solvent in the ink and the diffusion rate between the solvent and the nonsolvent. Complete extraction of the low vapor pressure solvent from the printed models may be facilitated by increasing the residence time in the bath and adding the steps such as sonication and heating.

Example 14: Results and Discussion—Summary

The present disclosure and examples presented a method to fabricate freeform and overhang structures of thermoplastics by extrusion-based printing using embedding medium, termed "freeform polymer precipitation (FPP)". In FPP, the embedding medium provided dual functions: (1) mechanical support to the printed filaments and (2) promoting phase separation of the printed inks by immersion precipitation. Polymer inks (i.e. thermoplastics dissolved in solvents) that possessed a broad range of viscosity (0.1-1000 Pa·s) and vapor pressure (0.04-60 kPa) were formulated. Both aqueous-based Carbopol gels (0.2-1.0 w/w %; $\sigma_y$=17-162 Pa; $E_e$=85-259 Pa) and ethanol-based gels ($\sigma_y$=2 Pa; $E_e$=84 Pa) were tested for their suitability as embedding medium. The dimensions of the printed filament, and the upward displacement of the printed filaments, depended on the rheological properties of the inks and the embedding medium, which then affected the vertical and lateral attachment of the printed filaments. The attachment of the filaments was achieved by choosing the appropriate overlap between the adjacent toolpaths in vertical and lateral directions. In situ solidification of the 3D printed polymer inks by immersion precipitation imparted porous microstructures in the fabricated objects. The porosity can be tuned by varying the viscosity of the embedding medium and adding pore-inducing agents into the inks. The removal of solvents was confirmed by TGA.

FPP offered an easy route to fabricate freeform and overhang structures consisting of thermoplastics. The present method provides an advantageous 3D printing of thermoplastics in embedded 3D printing using microparticulate medium, which overcomes the limitation arising from melting points of thermoplastics. Said differently, the present approach overcomes this limitation using the immersion precipitation of polymer inks in microparticulate gels. FPP paves a way to fabricate mechanically strong components and nano-tomicroporous components via direct ink writing, finding applications such as fabrication of functional devices and tissue engineering.

While the present disclosure has been particularly shown and described with reference to specific embodiments, it should be understood by those skilled in the art that various changes in form and detail may be made therein without departing from the spirit and scope of the present disclosure as defined by the appended claims. The scope of the present disclosure is thus indicated by the appended claims and all changes which come within the meaning and range of equivalency of the claims are therefore intended to be embraced.

The invention claimed is:

1. A method of printing a 3D freeform structure in an embedding medium, the method comprising:
   providing an ink composition in a nozzle, wherein the ink composition comprises a thermoplastic, a non-thermoplastic, a thermally degradable polymer, and/or a thermosensitive polymer, dissolved in a solvent;
   dispensing the ink composition through the nozzle into the embedding medium as the nozzle is moved along a path in the embedding medium to precipitate a printed structure along the path from the ink composition by immersion precipitation, wherein the ink composition exits from the nozzle directly in the embedding medium; and
   maintaining the printed structure in the embedding medium until the immersion precipitation is completed for forming the 3D freeform structure,
   wherein the embedding medium is a microparticulate non-Newtonian gel for providing physical support to the printed structure and is a nonsolvent for in situ solidification of the ink composition dispensed from the nozzle along the path in the embedding medium by the immersion precipitation.

2. The method of claim 1, wherein the thermoplastic comprises acrylonitrile butadiene styrene, acrylonitrile styrene acrylate, high impact polystyrene, polystyrene, polyamide, polycaprolactone, polyethylene, or polylactic acid, wherein the non-thermoplastic comprises cellulose acetate, cellulose acetate butyrate, cellulose acetate propionate, cellulose ester, or a derivative thereof.

3. The method of claim 1, wherein providing the ink composition comprises dissolving the thermoplastic in the solvent to form the ink composition having the thermoplastic present at a concentration of 20 to 60 w/w %.

4. The method of claim 1, wherein the solvent comprises acetone, dimethyl formamide, dichloromethane, chloroform, or dimethyl sulfoxide.

5. The method of claim 1, wherein the ink composition has
   a vapor pressure of 0.04 to 60 kPa; and/or
   a viscosity of 0.1 to 1000 Pa.s.

6. The method of claim 1, wherein dispensing the ink composition comprises:
   applying a pressure of 10 to 600 kPa; and/or
   dispensing the ink composition at a temperature of 20 to 30° C.

7. The method of claim 1, wherein the embedding medium has a yield stress of 17 Pa to 162 Pa and a shear modulus of 85 to 259 Pa.

8. The method of claim 1, wherein the embedding medium is a water-based gel or an ethanol-based microparticulate gel.

9. The method of claim 8, wherein the water-based gel comprises carbopol gel present at a concentration of 0.2 to 1.2 w/w %.

10. The method of claim 1, wherein dispensing the ink composition through the nozzle comprises moving the nozzle horizontally in the embedded medium at a speed of 12 mm/s or less.

11. The method of claim 1, wherein dispensing the ink composition through the nozzle comprises:
   operating a syringe, which is coupled to the nozzle, to have the nozzle positioned at a first height in the embedded medium to form a first layer of the printed structure, and
   operating the syringe to have the nozzle positioned at a second height in the embedded medium to form a second layer of the printed structure attached to the first layer of the printed structure, wherein the first height and the second height has a difference which renders the nozzle to migrate along and urge against the first layer without getting stuck in the first layer;
   or
   operating a syringe, which is coupled to the nozzle, to have the nozzle positioned at a first height in the embedded medium to form a first layer of the printed structure, and
   operating the syringe to have the nozzle positioned at a second height in the embedded medium to form a second layer of the printed structure spaced apart from the first layer of the printed structure, wherein the first height and the second height has a difference which renders the nozzle to maintain a gap from the first layer.

12. The method of claim 1, wherein dispensing the ink composition through the nozzle comprises:
   operating the syringe, which is coupled to the nozzle, to have the nozzle positioned in the embedded medium to form a first layer of the printed structure, and
   operating the syringe to have the nozzle positioned in the embedded medium at a lateral distance from the first layer of the printed structure to form a second layer of the printed structure laterally attached to the first layer of the printed structure, wherein the first layer of the printed structure has a width which is longer than the lateral distance;

or operating the syringe, which is coupled to the nozzle, to have the nozzle positioned in the embedded medium to form a first layer of the printed structure, and operating the syringe to have the nozzle positioned in the embedded medium at a lateral distance from the first layer of the printed structure to form a second layer of the printed structure spaced laterally apart from the first layer of the printed structure, wherein the first layer of the printed structure has a width which is shorter than the lateral distance.

13. The method of claim 1, wherein the ink composition further comprises an additive, wherein the additive comprises starch, α-cellulose, or laponite clay.

14. The method of claim 1, further comprising removing the solvent from the printed structure after removing the printed structure from the embedded medium to form the 3D freeform structure.

\* \* \* \* \*